(12) United States Patent
Matsuzawa et al.

(10) Patent No.: US 9,146,694 B2
(45) Date of Patent: Sep. 29, 2015

(54) DISTRIBUTION PROCESSING UNIT OF SHARED STORAGE

(71) Applicant: Hitachi, Ltd., Tokyo (JP)

(72) Inventors: Keiichi Matsuzawa, Yokohama (JP); Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 485 days.

(21) Appl. No.: 13/695,745

(22) PCT Filed: Oct. 18, 2012

(86) PCT No.: PCT/JP2012/006690
§ 371 (c)(1),
(2) Date: Nov. 1, 2012

(87) PCT Pub. No.: WO2014/061065
PCT Pub. Date: Apr. 24, 2014

(65) Prior Publication Data
US 2014/0115019 A1    Apr. 24, 2014

(51) Int. Cl.
*G06F 12/00* (2006.01)
*G06F 13/00* (2006.01)
*G06F 13/28* (2006.01)
*G06F 17/30* (2006.01)
*G06F 3/06* (2006.01)
*G06F 15/167* (2006.01)
*G06F 15/16* (2006.01)

(52) U.S. Cl.
CPC .............. *G06F 3/067* (2013.01); *G06F 3/0607* (2013.01); *G06F 3/0631* (2013.01); *G06F 15/167* (2013.01); *G06F 17/30203* (2013.01)

(58) Field of Classification Search
CPC ..................... G06F 17/30203; G06F 15/167
USPC ............................................ 707/827; 711/148
See application file for complete search history.

(56) References Cited

U.S. PATENT DOCUMENTS

| 5,893,086 | A | * | 4/1999 | Schmuck et al. ...... 707/999.001 |
| 7,650,331 | B1 | * | 1/2010 | Dean et al. ..................... 712/203 |
| 2006/0047928 | A1 | * | 3/2006 | Bhasin et al. ................. 711/162 |
| 2006/0265402 | A1 | * | 11/2006 | Edmond et al. .......... 707/999.01 |
| 2011/0066696 | A1 | * | 3/2011 | Cohen et al. ................... 709/213 |
| 2011/0119678 | A1 | * | 5/2011 | Filali-Adib et al. .......... 718/105 |

OTHER PUBLICATIONS

PCT International Search Report and Written Opinion on application PCT/JP2012/006690 mailed Sep. 19, 2013; 11 pages.

* cited by examiner

*Primary Examiner* — Usmaan Saeed
*Assistant Examiner* — Brian E. Weinrich
(74) *Attorney, Agent, or Firm* — Foley & Lardner LLP

(57) ABSTRACT

When processing data via multiple computers, the number of computers can be increased or decreased without actually moving the data assigned to the respective computers, and the data can be arranged and processed so as to enhance the performance of the system in response to the increase of the number of computers. A plurality of computers for performing data processing stores target data to be processed in a shared storage system, and when data processing is to be performed, the shared storage divides the storage area storing data corresponding to the number of computers, and creates virtual data storage areas referring to a portion of the storage area for each computer, so as to enable each computer to refer to independent virtual data storage areas and to complete data processing.

12 Claims, 22 Drawing Sheets

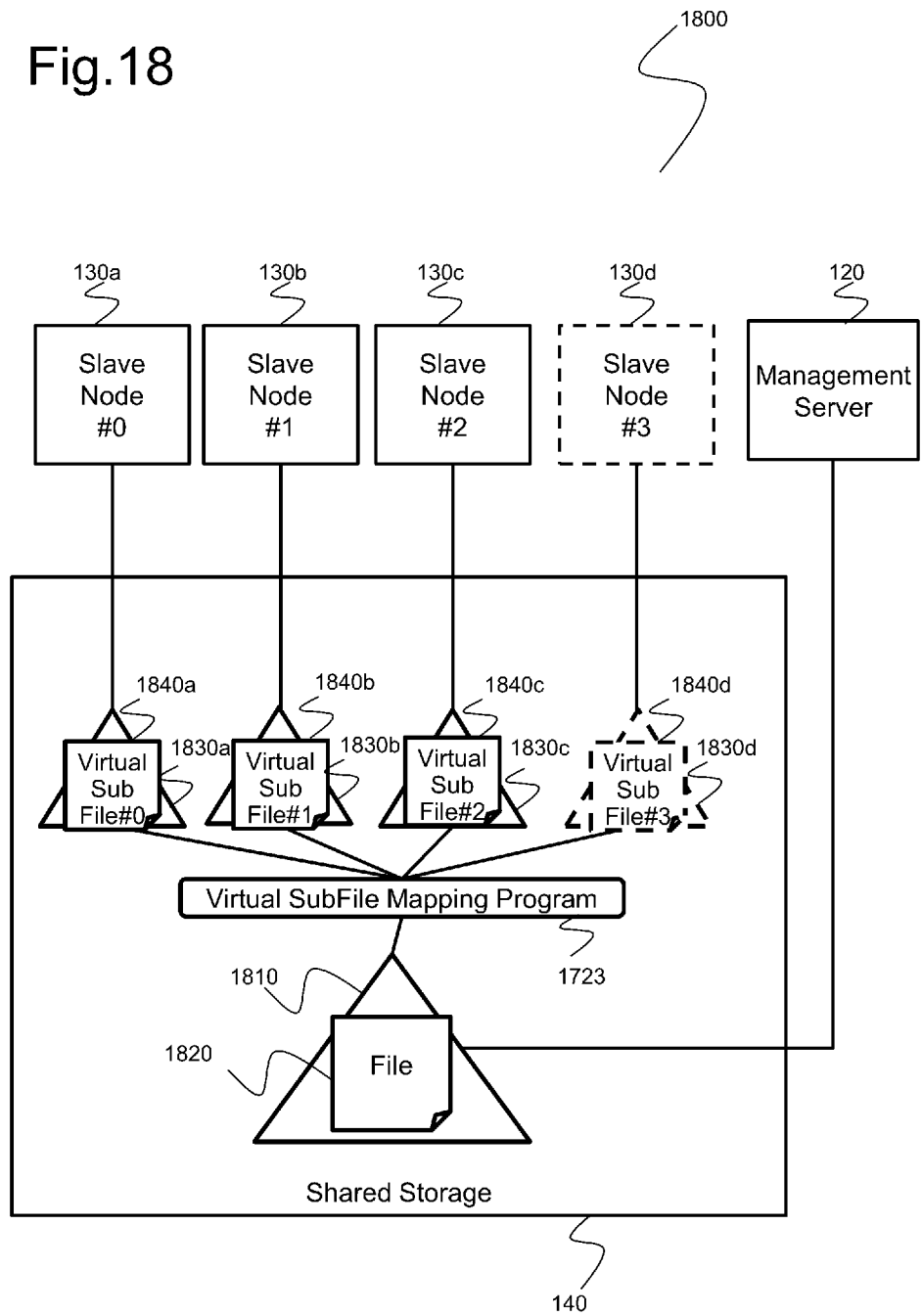

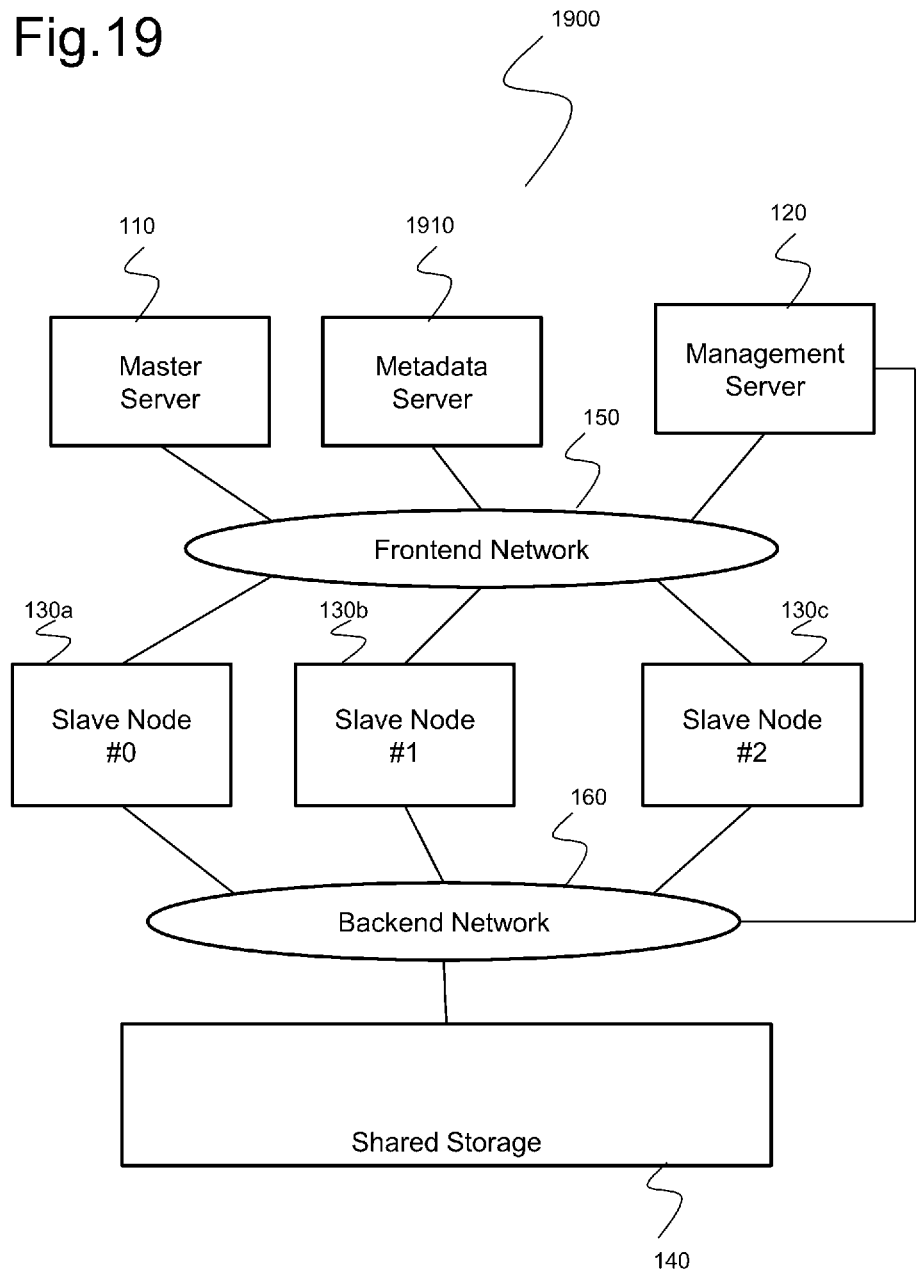

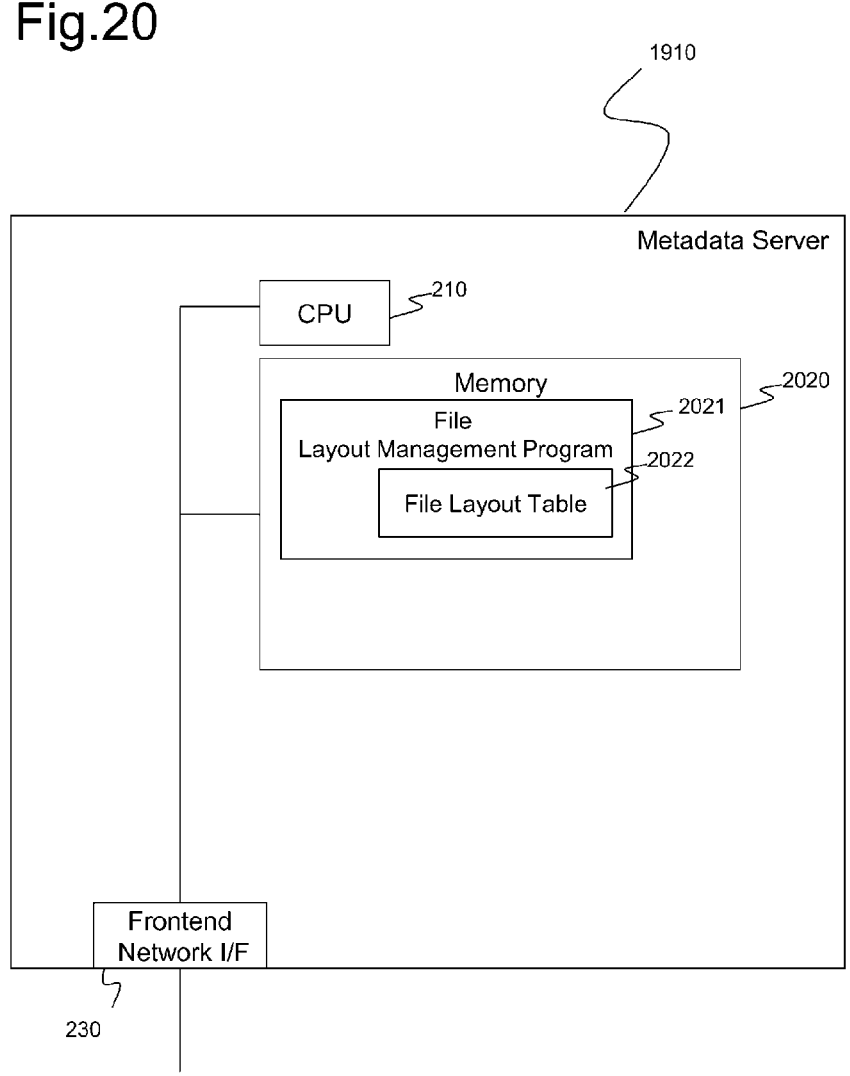

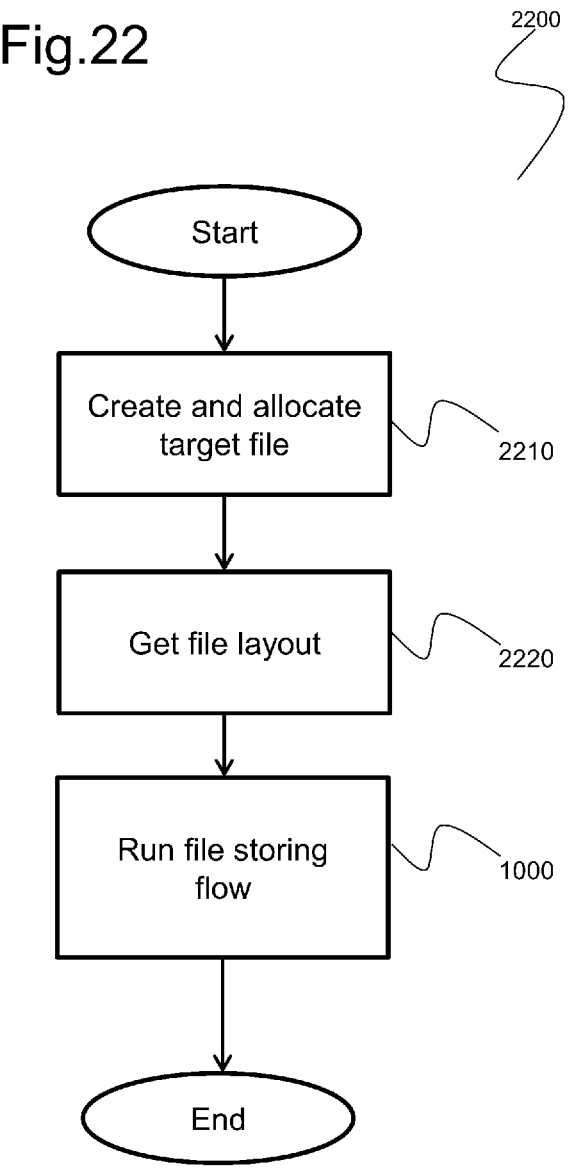

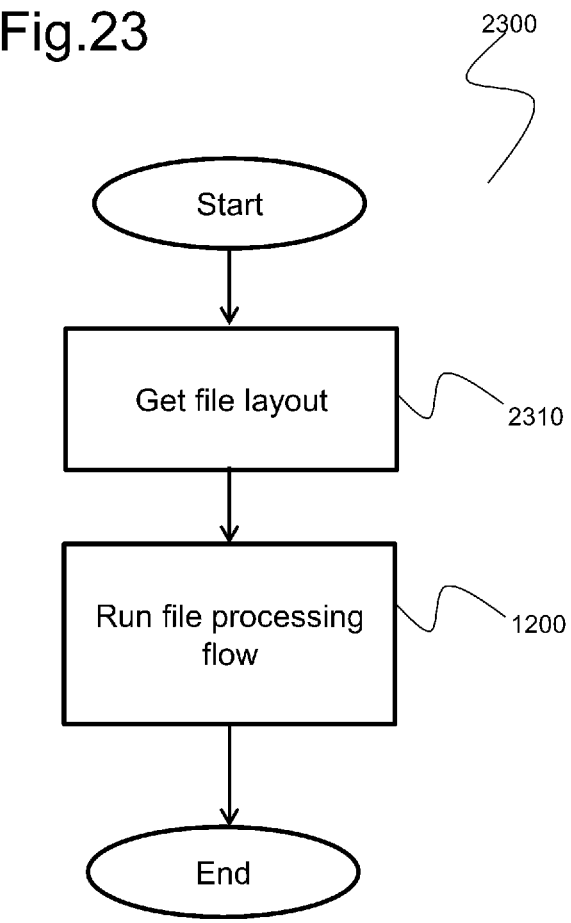

DISTRIBUTION PROCESSING UNIT OF SHARED STORAGE

TECHNICAL FIELD

The present invention relates to a data distribution processing unit using multiple computers and a shared storage.

BACKGROUND ART

Along with the slowing of the speed in which the processing performances of the individual computers are enhanced, or with the reduction of costs of the computer devices, there have been proposed various types of distribution processing methods for realizing processing of enormous amounts of data with improved performance by arranging a large number of computers. In order to efficiently perform distribution processing, it is important to enhance the expandability of the number of computers by reducing the amount of communication among computers during processing. Patent literature 1 discloses a "MapReduce" technique in which the target data to be processed is divided among computers and assigned to respective computers, wherein the processing of data assigned to each respective computer is performed by each computer, and the result of processing is assembled at the end. According to "MapReduce", during data processing, each computer refers to the data assigned to it, so that there is no need to communicate with other computers, but the expandability of the number of computers can be maintained.

According to the "MapReduce" technique, the expandability of the number of computers is maintained by not having to refer to the data in other computers, but on the other hand, once the data is assigned to a computer, if the number of computers is increased or decreased after assignment, data must be moved among computers, according to which the time required for increasing and decreasing the number of computers is elongated if the amount of data is enormous.

One possible method for preventing data movement when the number of computers is increased or decreased is to share the data among computers. One example of such method is a cluster file system constructing a shared file system by sharing disks among computers and only communicating the storage location information of data via nodes. Patent literature 2 illustrates an example of a cluster file system. However, generally according to the cluster file system, the management of the storage location information of data is either concentrated to one portion of the computers or distributed among all computers, but if the number of computers is increased, performance bottleneck occurs, by which the expandability of the number of computers is restricted.

CITATION LIST

Patent Literature

PTL 1: U.S. Pat. No. 7,650,331
PTL 2: U.S. Pat. No. 5,893,086

SUMMARY OF INVENTION

Technical Problem

The present invention provides a means for allocating data and processing data so as to increase or decrease the number of computers without having to move the data assigned to each computer when processing data via multiple computers, and to enhance the performance to correspond to the increase of the number of computers.

Solution to Problem

A plurality of computers for processing data stores data in a shared storage system. When data processing is to be performed, the shared storage divides a storage area of data in response to the number of computers, and creates virtual data storage areas referring to a portion of the storage area for each computer. Thereafter, each computer refers to the respective data storage area and completes data processing.

Advantageous Effects of Invention

Data areas corresponding to the number of computers can be created in response to the increase or decrease of the number of computers by merely changing the corresponding relationship between the data storage areas and the virtual data storage areas, without having to move the data. As a result, increase or decrease of the number of computers can be performed speedily with respect to the stored data.

BRIEF DESCRIPTION OF DRAWINGS

FIG. 18 is a relationship diagram of the slave node, the virtual sub file and the file according to embodiment 3.
FIG. 19 is a configuration diagram illustrating the application target of the present invention according to embodiment 4.
FIG. 20 is a configuration diagram of a metadata server according to embodiment 4.

FIG. 21 is an example of a file layout table according to embodiment 4.

FIG. 22 is a flowchart illustrating the steps for storing analysis data to the LU according to embodiment 4.

FIG. 23 is a flowchart showing the steps for subjecting the analysis data to distribution processing according to embodiment 4.

DESCRIPTION OF EMBODIMENTS

Embodiment 1

Figure 1:
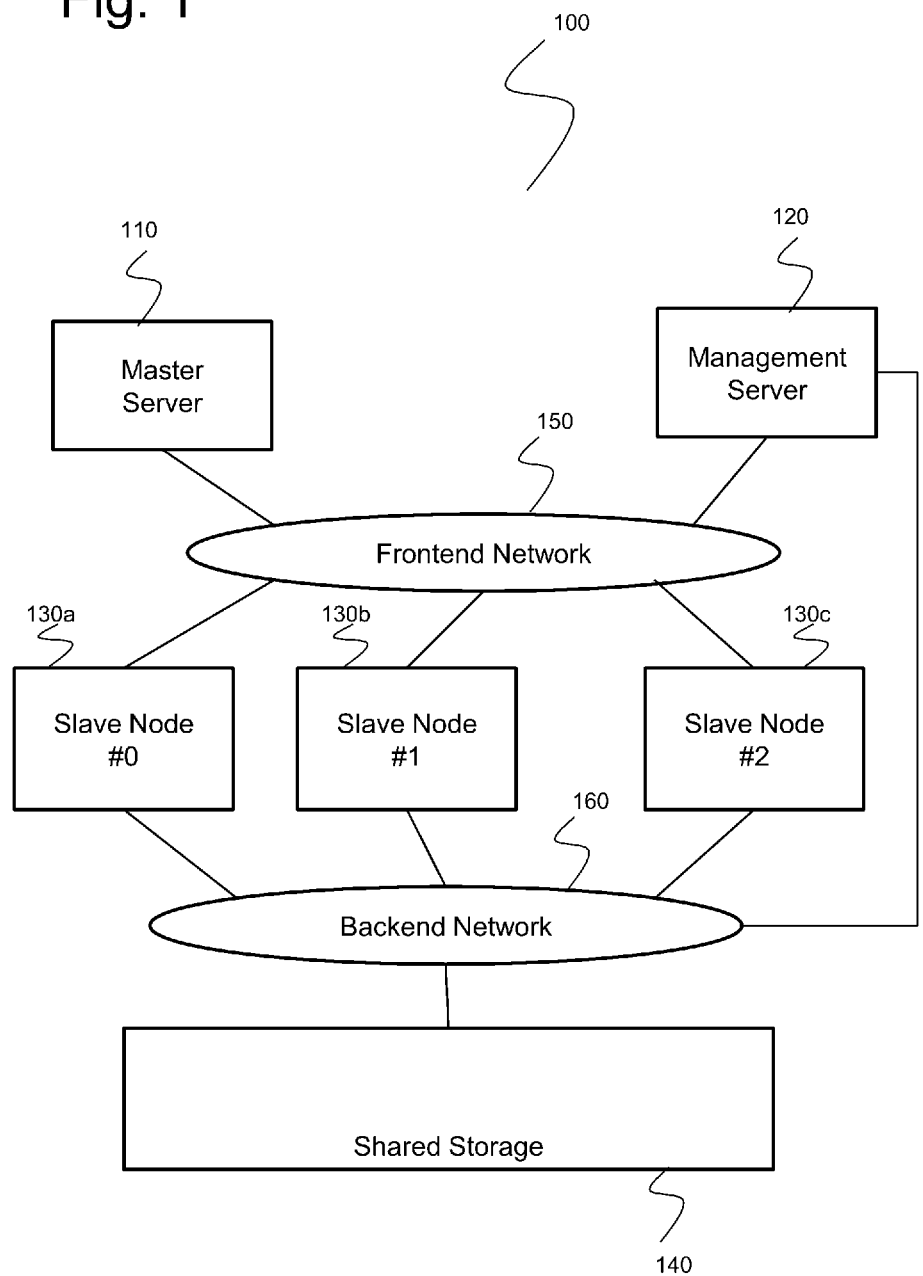
FIG. 1 is a configuration diagram illustrating the target of application of the present invention according to embodiments 1, 2 and 3.

FIG. 1 shows a computer system 100 for performing data distribution processing which is the target of the present invention. A master server 110 is a computer for issuing analytical processing of data (job) and for managing the termination of the job with respect to a plurality of slave node computers 130. A management server 120 is a computer for demanding the process target data to be stored in a shared storage 140 and the number of virtual sub LUs (Logical Units) within the shared storage 140 to be changed. Slave nodes 130a through 130c are computers for executing respective jobs and for reading data from and writing data to the virtual sub LUs in response to requests from other computers. The shared storage 140 is a unit for storing the data being the target of analysis.

The master server 110, the management server 120 and the slave node 130 communicate with each other via a frontend network 150. The management server 120, the slave node 130 and the shared storage 140 communicate with each other via a backend network 160. Communication with the frontend network 150 or the backend network 160 can be performed using communication protocols such as a Fibre Channel, an Ethernet (Registered Trademark) or an Infiniband. Further, within these protocols, transfer of data can be performed using communication protocols such as TCP/IP (Transmission Control Protocol/Internet Protocol), HTTP (Hypertext Transfer Protocol), SSH (Secure Shell), iSCSI (Internet Small Computer System Interface), and FCoE (Fibre Channel over Ethernet).

Figure 2:
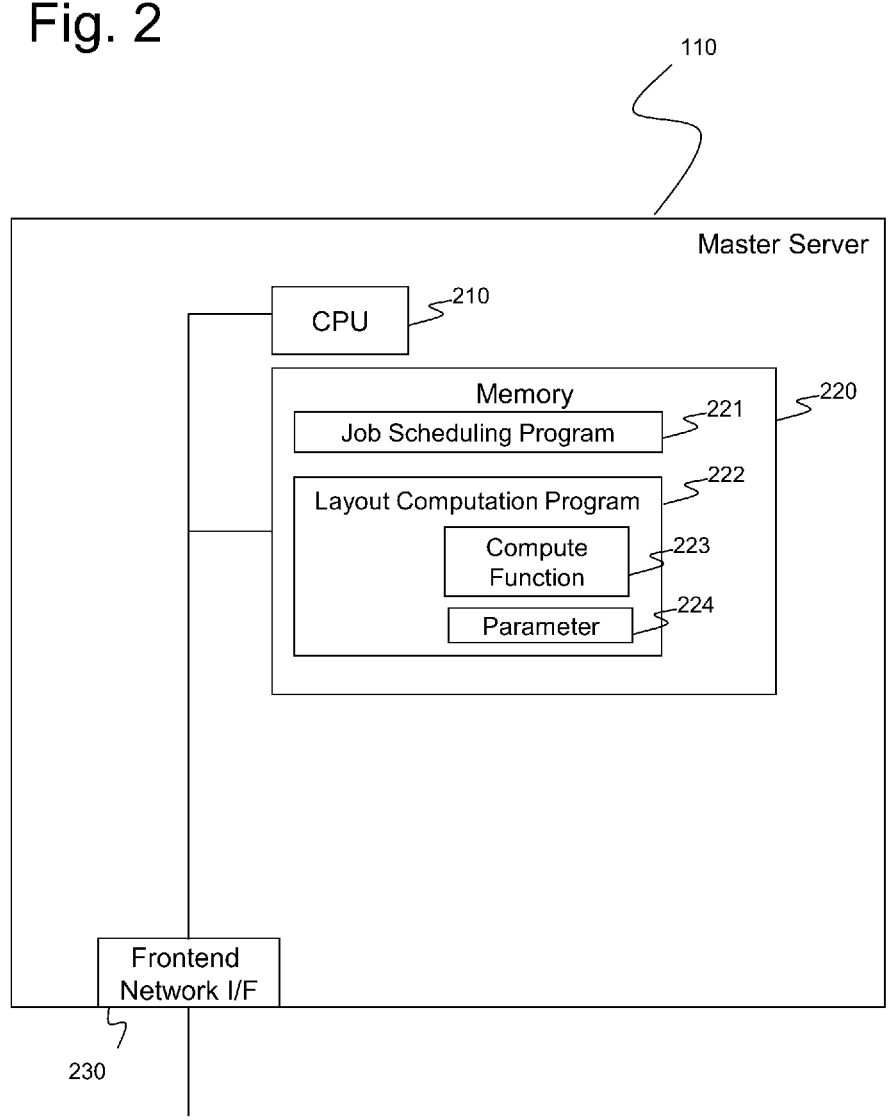
FIG. 2 is a configuration diagram of a master server.

FIG. 2 illustrates the configuration of a master server 110. The master server 110 is composed of a CPU (Central Processing Unit) 210, a memory 220, and a frontend network interface 230. The CPU 210 operates the computer in response to the contents of various programs stored in the memory 220. Hereafter, descriptions such as "processed by the computer" and "processed by the program" actually means that the processes are performed by the CPU in the computer according to the contents of the programs stored in the memory. The memory 220 stores a job scheduling program 221 and a layout computation program 222. The job scheduling program 221 is a program for issuing a job of data analysis to a plurality of the slave node 130 and for managing completed jobs. The layout computation program 222 is a program for computing the corresponding relationship between the LU and the virtual sub LU. Moreover, the layout computation program 222 internally stores a compute function 223 and a parameter 224. If there are multiple LUs, the compute function 223 and the parameter 224 can store multiple independent values corresponding to the number of LUs.

The master server 110 communicates with other computers through the frontend network 150 via a frontend network interface 230. Examples of the frontend network interface 230 include an NIC (Network Interface Card), an HBA (Host Bus Adapter) and a CNA (Converged Network Adapter).

Figure 3:
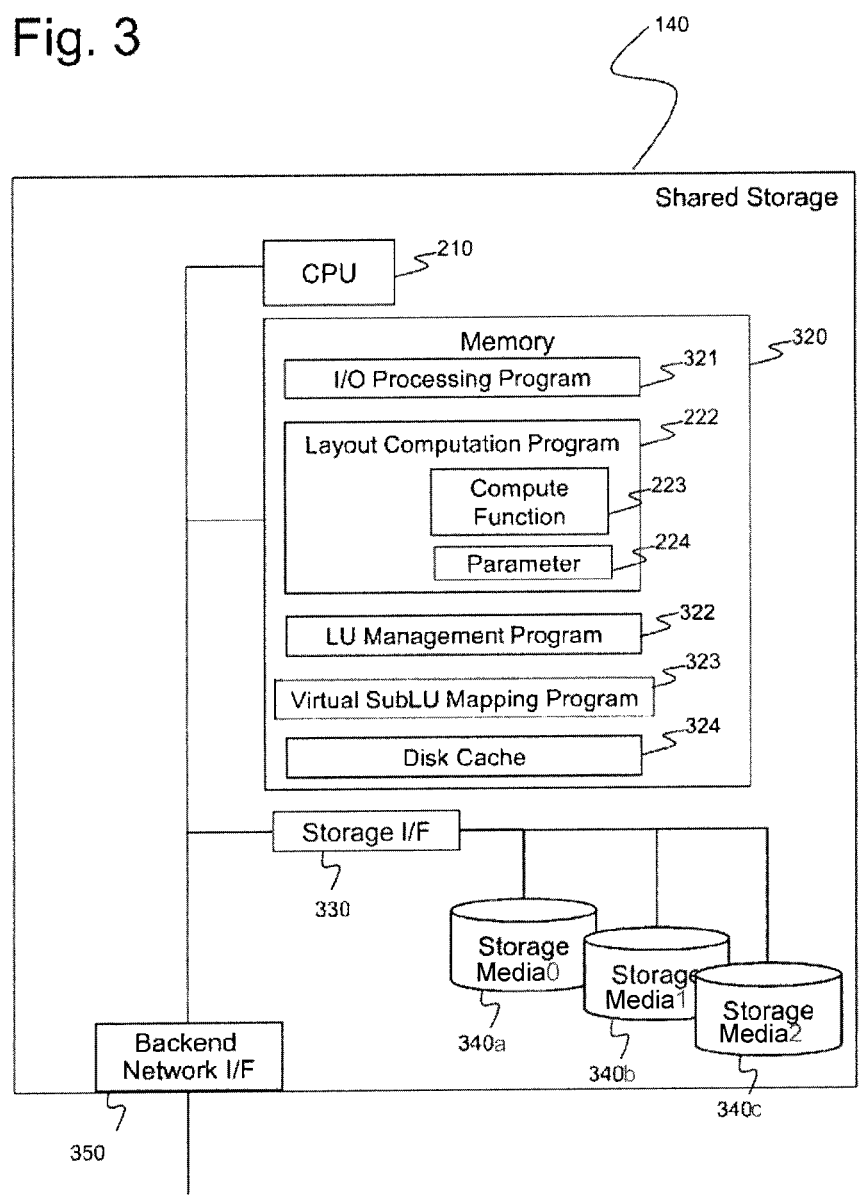
FIG. 3 is a configuration diagram of a shared storage according to embodiment 1.

FIG. 3 is a configuration view of the shared storage 140. The shared storage 140 is composed of a CPU 210, a memory 320, a backend network interface 350, a storage interface 330, and storage media 340a-c. The memory 320 stores an I/O processing program 321, a layout computation program 222, an LU management program 322, a virtual sub LU mapping program 323, and a disk cache 324. The I/O processing program 321 is a program for reading data to and writing data from storage media 340a-c based on I/O requests from other computers. The LU management program 322 is a program for managing creation and deletion etc. of an LU which is one or more data storage areas from a plurality of the storage media 340a-c. The virtual sub LU mapping program 323 is a program for constituting a virtual sub LU from an LU or for converting the I/O request to the virtual sub LU to an I/O request to the LU. The disk cache 324 is an area for caching data in the storage media 340a-c, which is used to enhance the speed of response to an I/O request since data does not have to be read from or written to the storage media 340a-c.

The CPU 210 or the disk cache 324 reads data from or writes data to the storage media 340a-c via the storage interface 330. The storage media 340a-c is media for storing the target data to be processed. Examples of the storage media 340a-c include Floppy (Registered Trademark) disks, Hard Disk Drives, magnetic media such as magnetic tapes, semiconductor memories such as Solid State Disks and flash memories, nonvolatile memories such as Phase Change Memories, and optical disks such as Compact Disks and Digital Versatile Disks. Furthermore, multiple storage media assembled via a RAID (Redundant Array of Independent Disks) technique, or external computers having data storage functions can be used as storage media 340a-c. The process for reading and writing data via the storage interface 330 differs according to the type of the storage media 340a-c. Examples of the media types include an IDE (Integrated Drive Electronics), a SCSI (Small Computer System Interface), a SATA (Serial Advanced Technology Attachment), a SAS (Serial Attached SCSI), and a Fibre Channel.

The shared storage 140 communicates with other computers through the backend network 160 via the backend network interface 350. The backend network interface 350 uses NIC, HBA, CNA and the like, similar to the frontend network interface 230.

Figure 4:
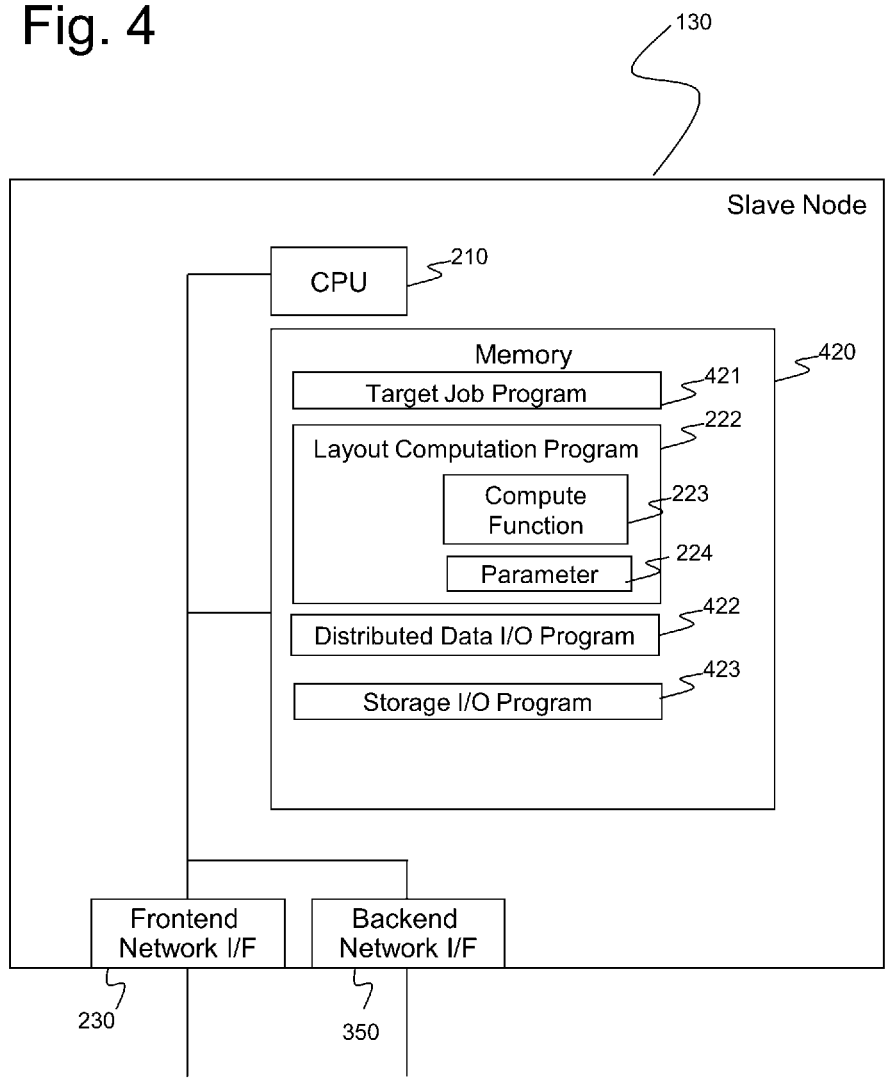
FIG. 4 is a configuration diagram of a slave node according to embodiment 1.

FIG. 4 shows a configuration diagram of the slave node 130. The slave node 130 is composed of a CPU 210, a memory 420, a frontend network interface 230, and a backend network interface 350. The memory 420 stores a target job program 421, a layout computation program 222, a distributed data I/O program 422 and a storage I/O program 423. The target job program 421 is a program for executing an analytical processing of data (job) requested by the user of the computer to the data. The distributed data I/O program 422 is a program for transferring an I/O request to another node when the storage position of target data of the I/O request is in another node. The storage I/O program 423 is a program for issuing an I/O request with respect to a virtual sub LU or an LU within the shared storage 140.

Figure 5:
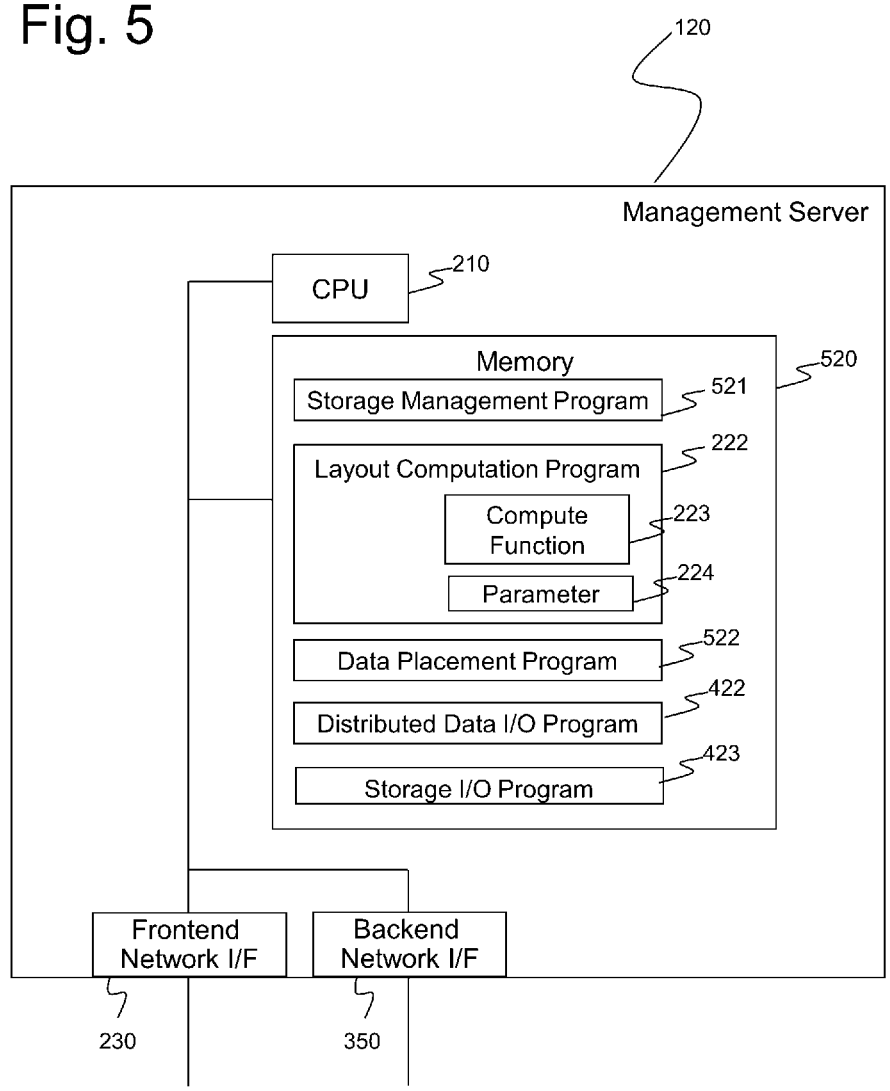
FIG. 5 is a configuration view of a management server.

FIG. 5 is a configuration diagram of the management server 120. The management server 120 is composed of a CPU 210, a memory 520, a frontend network interface 230 and a backend network interface 350. The memory 520 stores a storage management program 521, a layout computation program 222, a data placement program 522, and a distributed data I/O program 422. The storage management program 521 is a program for demanding reconfiguration of a virtual sub LU to the shared storage 140 and for notifying the configuration of the virtual sub LU to other computers. The data placement program 522 is a program for storing the analysis target data initially to the shared storage 140. Further, the memory 520 can store the storage I/O program 423, and in that case, the management server 120 can also issue an I/O request to the virtual sub LU or the LU of the shared storage 140.

Figure 6:
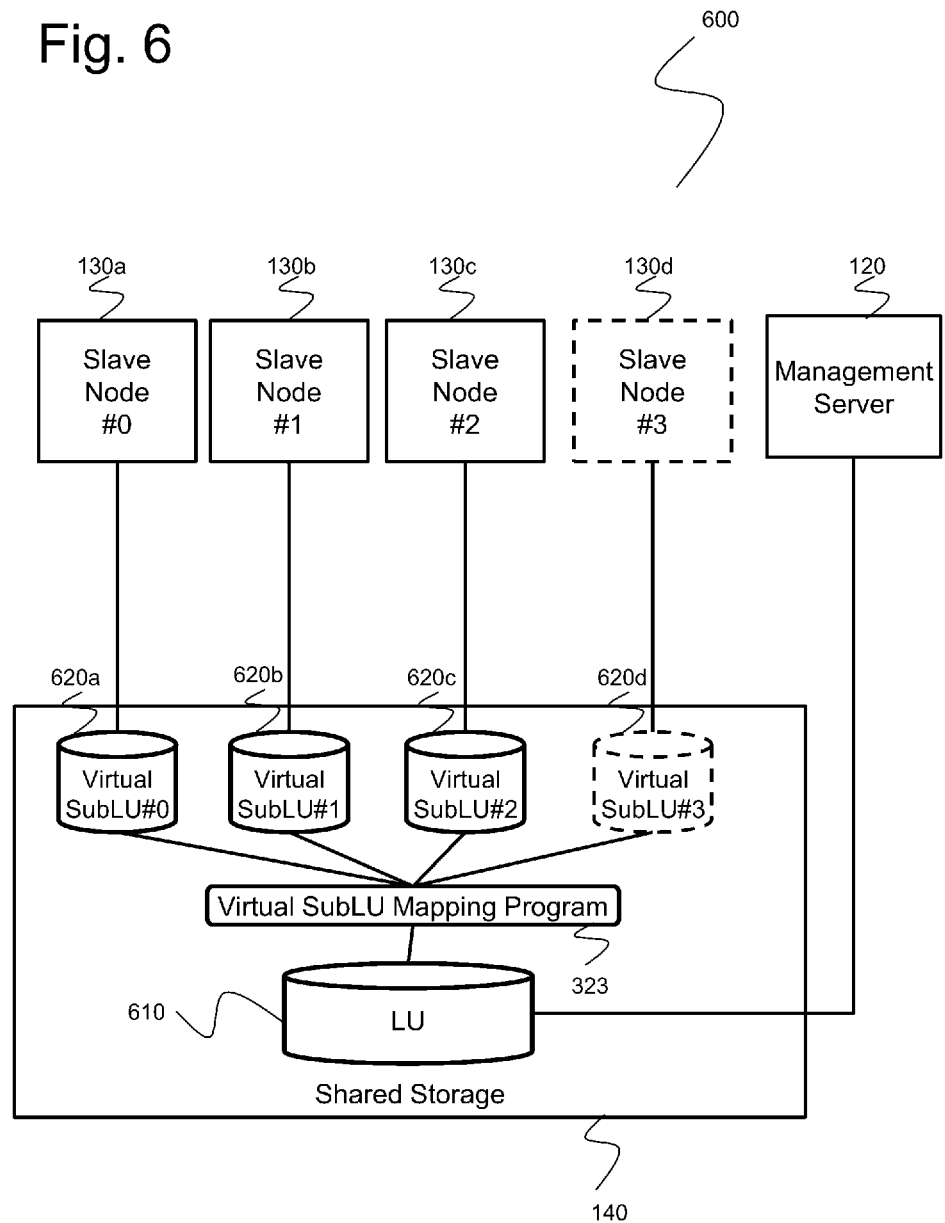
FIG. 6 is a relationship diagram of the slave node, the virtual sub LU and the LU according to embodiment 1.

FIG. 6 illustrates a relationship diagram 600 regarding data management according to the present embodiment. The LU management program 322 of the shared storage 140 constructs an LU 610 which is a logical data management unit for storing the process target data from a plurality of storage media 340*a-c*. Multiple LUs 610 can exist when multiple process target data exists. In the following description, an example where a single target data and a single LU 610 exist is illustrated.

The virtual sub LU mapping program 323 constructs multiple virtual sub LUs 620*a* through 620*c* from the LU 610. Each virtual sub LU 620*a* through 620*c* actually refer to a partial area of the LU 610, and the I/O request to the virtual sub LUs 620*a* through 620*c* is converted to a request to a corresponding area of the LU 610 via the virtual sub LU mapping program 323.

Slave nodes 130*a* through 130*c* use unique numbers #0 through #2 to connect to virtual sub LUs 620*a* through 620*c* having the same numbers #0 through #2, and perform I/O request and data processing respectively. Since the virtual sub LUs 620*a* through 620*c* referred to by the respective slave nodes 130*a* through 130*c* refers to a portion of the LU 610, so that the respective slave nodes 130*a* through 130*c* indirectly have a portion of the data out of all data areas of the LU 610 set as the processing target.

In order to enhance the speed of data processing using the present configuration, for example, it is possible to add a new slave node 130*d* denoted with number #3. In that case, the virtual sub LU mapping program 323 creates virtual sub LUs 620*a* through 620*d* by changing the reference relationship between the LU 610 and the virtual sub LU, wherein by connecting the newly created virtual sub LU 620*d* denoted with number #3 to the slave node 130*d*, it becomes possible to increase the number of slave nodes for processing data within the LU 610.

The LU and the virtual sub LU can be connected through another computer. For example, if the management server 120 stores the storage I/O program 423, a configuration can be adopted where the management server 120 connects to the LU and sends an I/O request directly to the LU instead of via the virtual sub LU.

Figure 7:
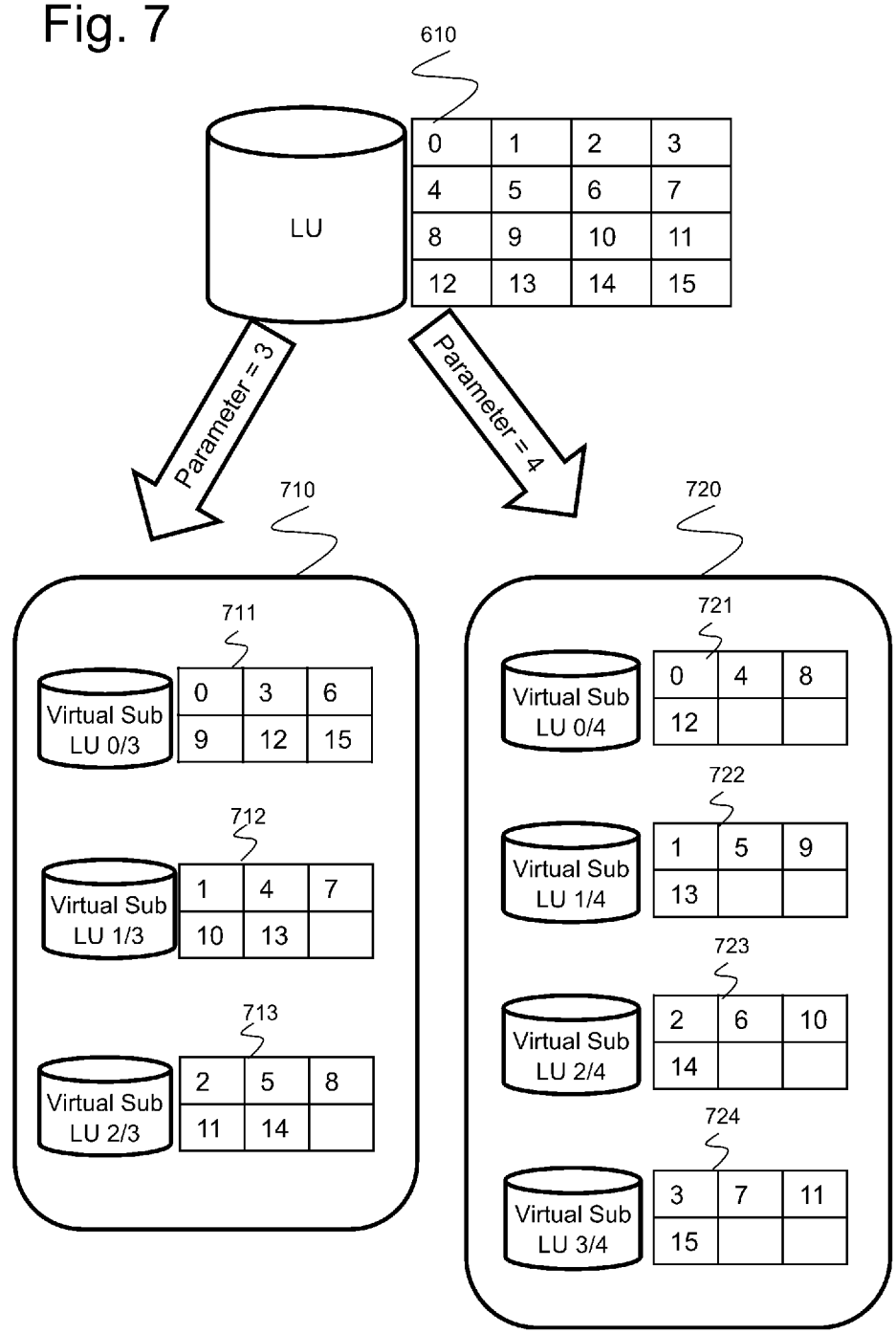
FIG. 7 is a view showing the method for creating a plurality of virtual sub LUs from an LU.

FIG. 7 illustrates a corresponding relationship between the LU and the virtual sub LU. FIG. 7 illustrates an example in which the LU 610 is composed of 16 fixed length blocks 0 to 15. Now, we will consider an example of creating a virtual sub LU 710 composed of three virtual sub LUs, which are a virtual sub LU0 (711), a virtual sub LU1 (712) and a virtual sub LU2 (713) having unique virtual sub LU numbers 0, 1 and 2.

The virtual sub LU mapping program 323 computes the correspondence between the blocks of the LU and the virtual sub LU via the layout computation program 222. This correspondence is realized via functions f, g and h stored in the compute function 223 corresponding to the LU within the layout computation program 222 and a number of parameters $P_i$ ($i=1$ to n) stored in the parameter 224. The relationship between the virtual sub LU number X, the block Y within the virtual sub LU and the block Z within the LU is computed to be determined uniquely using functions f, g and h and the parameter Pi as arguments. Actually, when certain functions f, g and h are defined, they are expressed in the following forms: $X=f(Z, P1, P2, \ldots, Pn)$, $Y=g(Z, P1, P2, \ldots, Pn)$, and $Z=h(X, Y, P1, P2, \ldots, Pn)$.

In FIG. 7, a method using residue calculation is illustrated as an example. Each virtual sub LU 711, 712 and 713 takes the residue of 3, which is the number of virtual sub LUs, from the original LU 610, so that each sub LU is composed of blocks in which the number of virtual sub LU and the residue correspond. In this case, the I/O requests to the virtual sub LU can be converted via computation to an LU request. Generally, when the number of virtual sub LUs is set as N, the I/O request to block Y of the virtual sub LU number X can be associated with block Z within LU 610 based on value Z acquired via the following expression: $Z=X \times N+Y$. In contrast, it is possible to compute the corresponding virtual sub LU number X and the block Y within the virtual sub LU based on values X and Y acquired via the following expressions from block Z within the LU: $X=Z \% N$ (% refers to residue calculation), and $Y=Z/N$ (residue is rounded down). In this computation example, if there is only one variety of parameter, $P1=N$, the following expressions can be adopted: $X=f(Z, N)=Z \% N$, $Y=g(Z, N)=Z/N$, and $Z=h(X, Y, N)=X \times N+Y$, so that the present example corresponds to the aforementioned computation method.

In another configuration example, the LU can be divided into N parts having uniform sizes. At this time, the following expressions can be adopted: $X=f(Z, N)=Z/(Z/N)$, $Y=g(Z, N)=Z \%(Z/N)$, and $Z=h(X, Y, N)=X \times (Z/N)+Y$, so that the present example corresponds to the aforementioned computation method.

In yet another configuration example, the residue calculation can be extended to change the size corresponding to each virtual sub LU. For example, if $N=3$, in order to have the capacity assigned in the ratio of 3:2:1 to three virtual sub LUs, the following correspondence is acquired: $X=f(Z, 3)=\{0$ if $Z \%6$ is 0 to 2, 1 if $Z \%6$ is 3 to 4, and 2 if $Z \%6$ is $5\}$, $Y=g(Z, 3)=\{(Z/6) \times 3+(Z \%6)$ if $Z \%6$ is 0 to 2, $(Z/6) \times 2+(Z \%6-3)$ if $Z \%6$ is 3 to 4, and $(Z/6)$ if $Z \%6$ is $5\}$, $Z=h(X, Y, 3)=\{(Y/3) \times 6+(Y \%3)$ if X is 0, $(Y/2) \times 6+(Y \%2+3)$ if X is 1, and $Y \times 6+(Y+5)$ if X is $2\}$. These results also satisfy the aforementioned configuration conditions. Such method for changing the size in correspondence to each virtual sub LU can be utilized to equalize the processing time by changing the amount of data to be allocated to each slave node 130 if the amount of resource retained in a plurality of slave node 130 (such as the performance of the CPU 210 or the memory 420) is not uniform among respective slave nodes.

According to the method for generating a virtual sub LU using the compute function 223 and the parameter 224, if the compute function 223 and the parameter 224 are shared at the initial time of the processing, the layout computation program 222 that each computer has can compute the compute the X, Y and Z mutually and uniquely, so that there is no need to communicate with other computers each time the relationship between X, Y and Z must be computed.

Moreover, if the virtual sub LU number N is included as a portion of the parameter 224, the virtual sub LU mapping program 323 can change the number of virtual sub LUs by simply changing the value of N. The virtual sub LUs 721, 722, 723 and 724 included in a virtual sub LU 720 in FIG. 7 illustrates an example in which four virtual sub LUs are generated as $N=4$. This change in N merely requires changing the relational expression between X, Y and Z, and does not require movement of data within the LU 610 or among virtual sub LUs, so that it can be performed speedily.

Figure 8:
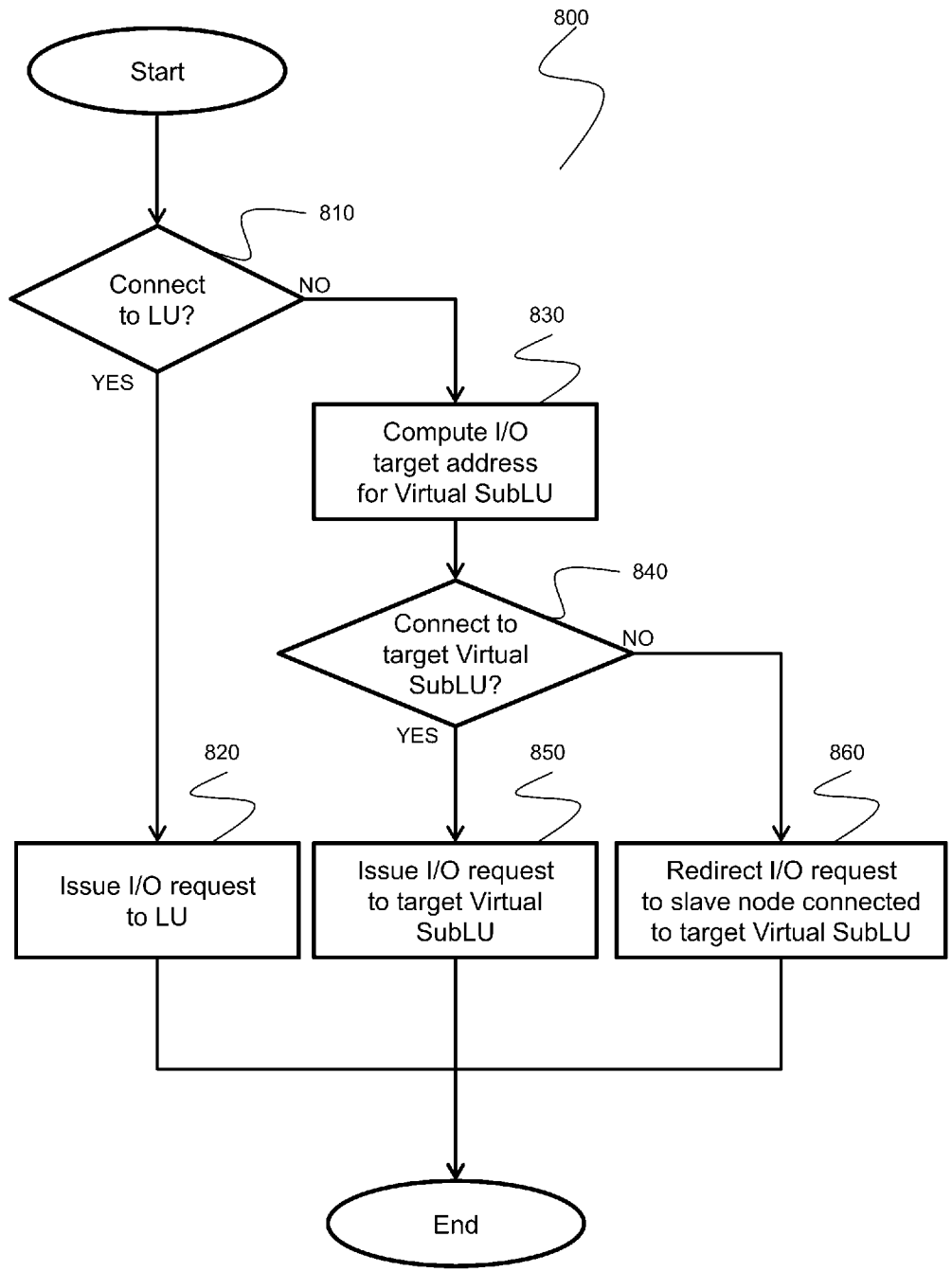
FIG. 8 is a flowchart of the process of a computer for issuing an I/O request to a shared storage.

FIG. 8 illustrates a flowchart of a process flow 800 for issuing an I/O process request with respect to the shared storage executed by the management server 120 or the slave node 130. In the process flow 800, steps 820 and 850 for issuing I/O are executed by the storage I/O program 423, and the other steps are executed by the distributed data I/O program 422.

If an I/O request is set to block Z within the LU, in step 810, whether the computer for executing the process flow 800 is directly connected to the LU or not is determined. If the computer is directly connected to the LU (YES), then in step 820, an I/O request is issued to block Z within the LU. If the computer is not directly connected to the LU (NO), the I/O request must be issued via the virtual sub LU, so that in step 830, the corresponding virtual sub LU number X and the block number Y within the virtual sub LU are computed based on the I/O request to block Z within the LU via the layout computation program 222.

In step 840, it is determined whether the computer for executing the process flow 800 is connected to a virtual sub LU having number X or not. If the computer is connected to a virtual sub LU having number X (YES), in step 850, an I/O request is issued to block Y within virtual sub LU of number X. If the computer is not connected to virtual sub LU of number X (NO), in step 860, the I/O request is transferred to a slave node 130 having number X connected to virtual sub LU number X. The slave node 130 of number X to which the I/O request has been transferred recursively executes the process flow 800, but in this example, since the slave node 130 of number X is connected to the virtual sub LU having number X, the determination result of step 840 will always be YES and the procedure will advance to step 850, so that transfer will not be performed again in the process flow 800 of the transfer destination slave node.

Figure 9:
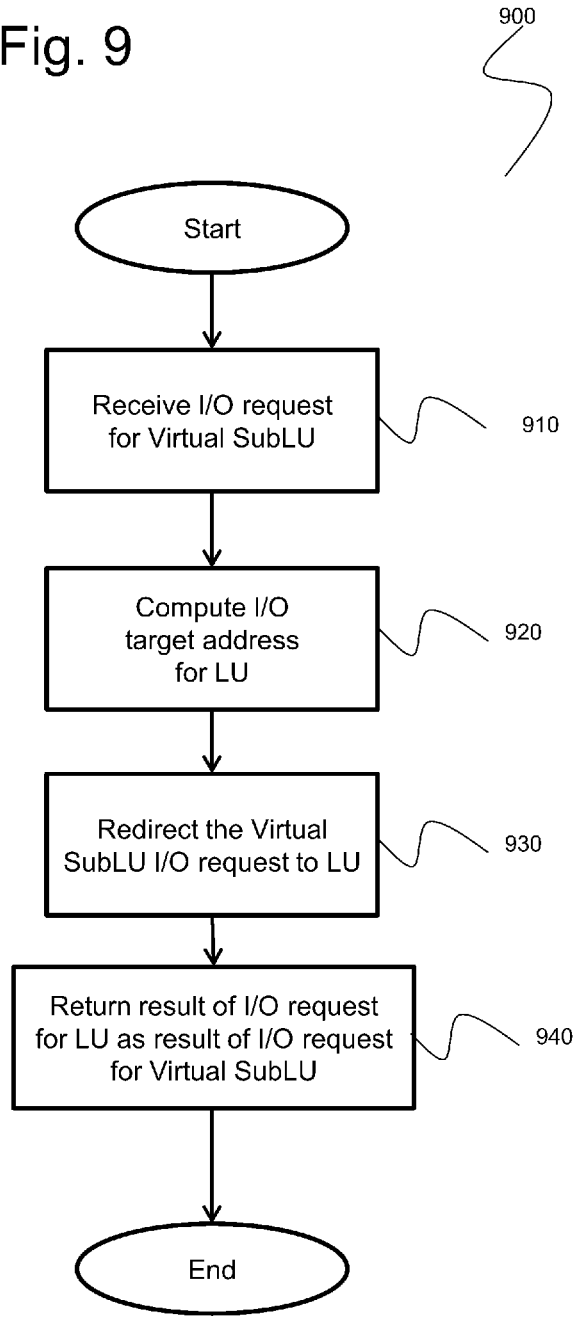
FIG. 9 is a flowchart for converting the I/O request to the virtual sub LU to an I/O request to an LU.

FIG. 9 illustrates a flowchart of the process flow 900 executed by the I/O processing program 321 when the shared storage 140 receives an I/O request from other computers to the virtual sub LU. At first, in step 910, the program receives an I/O request to the virtual sub LU, and acquires a virtual sub LU number X and a block number Y within the virtual sub LU. Next, in step 920, block Z within the LU is acquired from the virtual sub LU number X and the block number Y within the virtual sub LU using the layout computation program 222.

Thereafter, in step 930, the I/O request to the virtual sub LU number X and the block number Y within the virtual sub LU is transferred as an I/O request to block Z within the LU, and the I/O is executed by the storage I/O program 423. Finally, in step 940, the result of the I/O request to block Z within the LU is returned to the request source computer as a result of the I/O request for the original virtual sub LU number X and the block number Y within the virtual sub LU.

Figure 10:
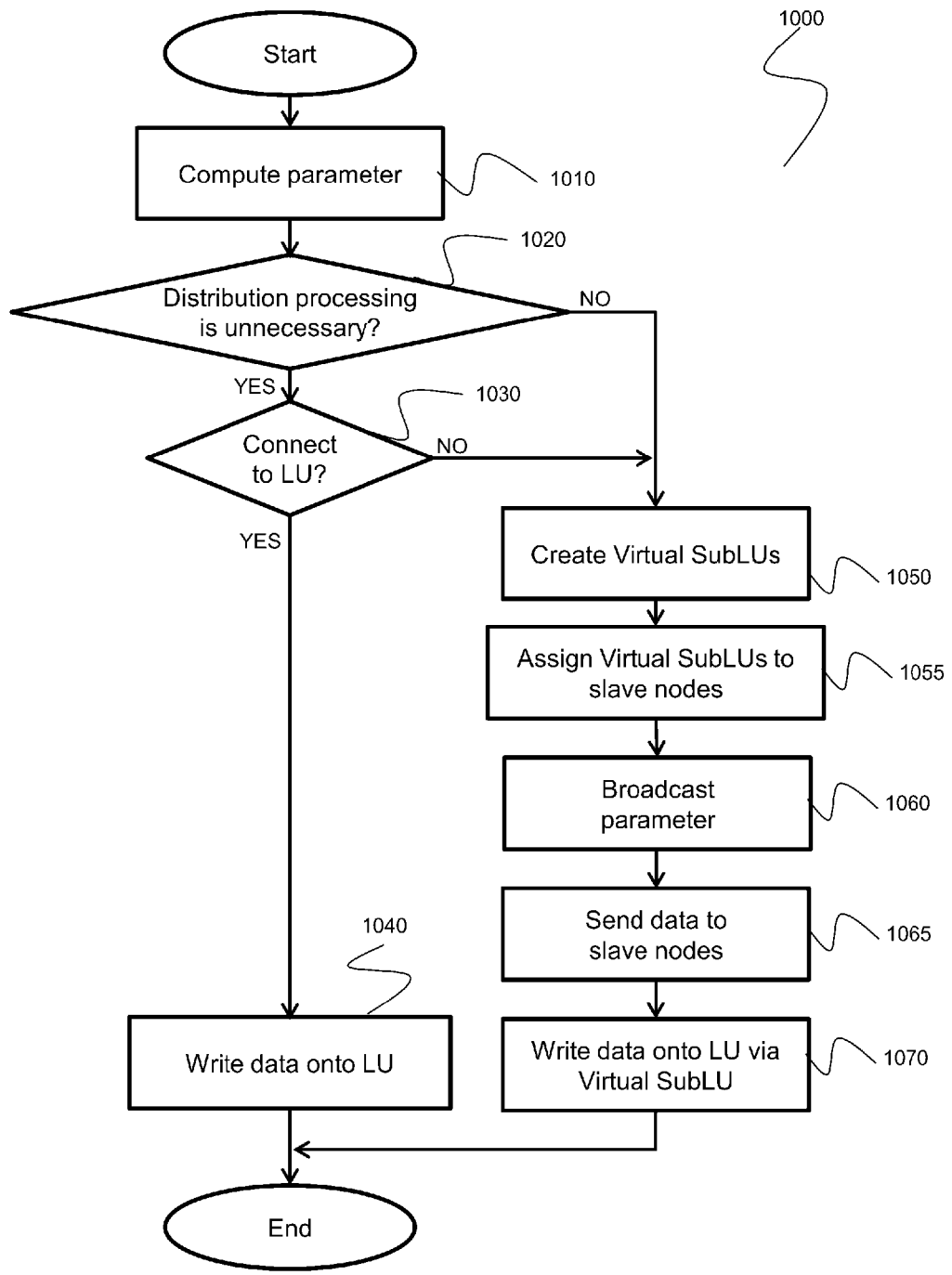
FIG. 10 is a flowchart illustrating the steps for storing analysis data to the LU.

FIG. 10 shows a flowchart of a process flow 1000 related to data storage for storing the analysis target data in the LU 610 according to the present configuration 100. In the process flow 1000, steps 1010 through 1060 excluding step 1040 are executed by the storage management program 521 in the management server 120, and steps 1065 and 1070 are executed by the data placement program 522 of the management server 120.

At first, in step 1010, the data placement program 522 determines the compute function 223 and the parameter 224. The determination is based on the performances of the respective computers, the frontend network 150 and the backend network 160, the configuration of the computer such as the consumption power and the usage fee of the computer, and the will of the user. For example, if the processing performance of the management server 120 is high, the computer function 223 and the parameter 224 are assigned so as to construct a large number of virtual sub LUs to utilize a large number of slave nodes, while on the other hand, if the data transfer performance from the management server 120 via the backend network 160 to the shared storage 140 is sufficiently high, it is possible to perform selection so as not to construct a virtual sub LU and not pass a slave node.

In step 1020, if it is determined in the aforementioned step that distribution processing to a slave node is not necessary (YES), and in step 1030, the management server 120 directly connects to the LU 610 in the shared storage 140 (YES), then in step 1040, the storage I/O program 423 of the management server 120 directly requests I/O to the LU 610 and stores data.

If it is determined in step 1020 that distribution processing is necessary (NO), or if it is determined in step 1030 that the management server 120 is not directly connected to the LU 610 (NO), data storage via the slave node 130 and the virtual sub LU described in steps 1050 and thereafter is performed.

Step 1050 is a process executed by the storage management program 521 of the management server 120, wherein the compute function 223 and the parameter 224 determined in step 1010 is transmitted to the virtual sub LU mapping program 323 of the shared storage 140, and orders to create a plurality of virtual sub LUs. Next, in step 1055, a demand is output to the slave nodes 130 and the shared storage 140 to connect slave nodes 130 corresponding to virtual sub LU numbers of the plurality of virtual sub LUs created in step 1050.

Then, in step 1060, the compute function 223 and the parameter 224 are notified to the layout computation program 222 of each computer. According to this procedure, each computer is capable of computing the corresponding relationship between the virtual LUs and the blocks of the LUs. Next, in step 1065, the management server 120 transmits the respective blocks of the analysis target data to slave nodes 130 corresponding to virtual sub LU number X computed based on block number Z. This process is equivalent to step 860 in the process flow 800 of FIG. 8.

Thereafter, in step 1070, the slave node 130 having received the block transmitted in step 1060 writes data onto the corresponding block Y within the virtual LU of number X. According to the above-described process flow 1000, the management server 120 can store the process target data to the LU 610 within the shared storage 140.

Figure 11:
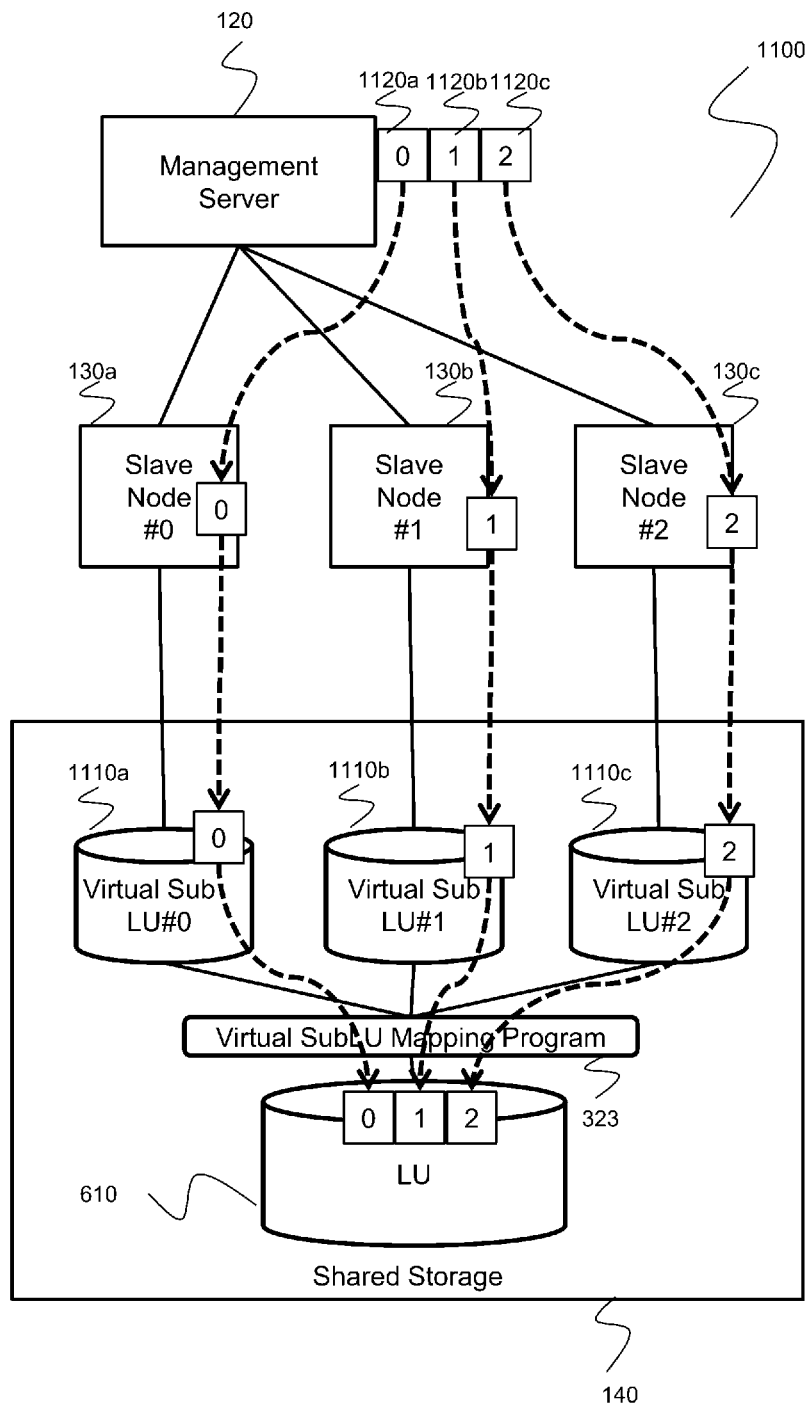
FIG. 11 is a view showing a path through which the analysis data is stored in the LU.

FIG. 11 shows an example of the flow of data according to process flow 1000 in FIG. 10. In FIG. 11, as shown in FIG. 7, a residue calculation is used for the compute function 223, and N=3 is used as the parameter 224, so as to create three virtual sub LUs 1110a (number 0), 1110b (number 1) and 1110c (number 2) from the LU 610, wherein these virtual sub LUs are coupled via corresponding slave nodes 130a (number 0), 130b (number 1) and 130c (number 2). When the management server 120 wishes to store the processing data composed of three data blocks 1120a (number 0), 1120b (number 1) and 1120c (number 2), then in step 1010, it is assumed that the data placement program 522 determines to perform processing by creating three virtual sub LUs 1110a, 1110b and 1110c. Since the residue of dividing each block number by 3 is 0, 1 and 2 for the respective data blocks 1120a, 1120b and 1120c, the respective data blocks 1120a, 1120b and 1120c store data via the slave node 130a and the virtual sub LU 1110a, or the slave node 130b and the virtual sub LU 1110b, or the slave node 130c and the virtual sub LU 1110c, and finally, the three data blocks 1120a, 1120b and 1120c that the management server 120 has are stored in the LU 610.

Figure 12:
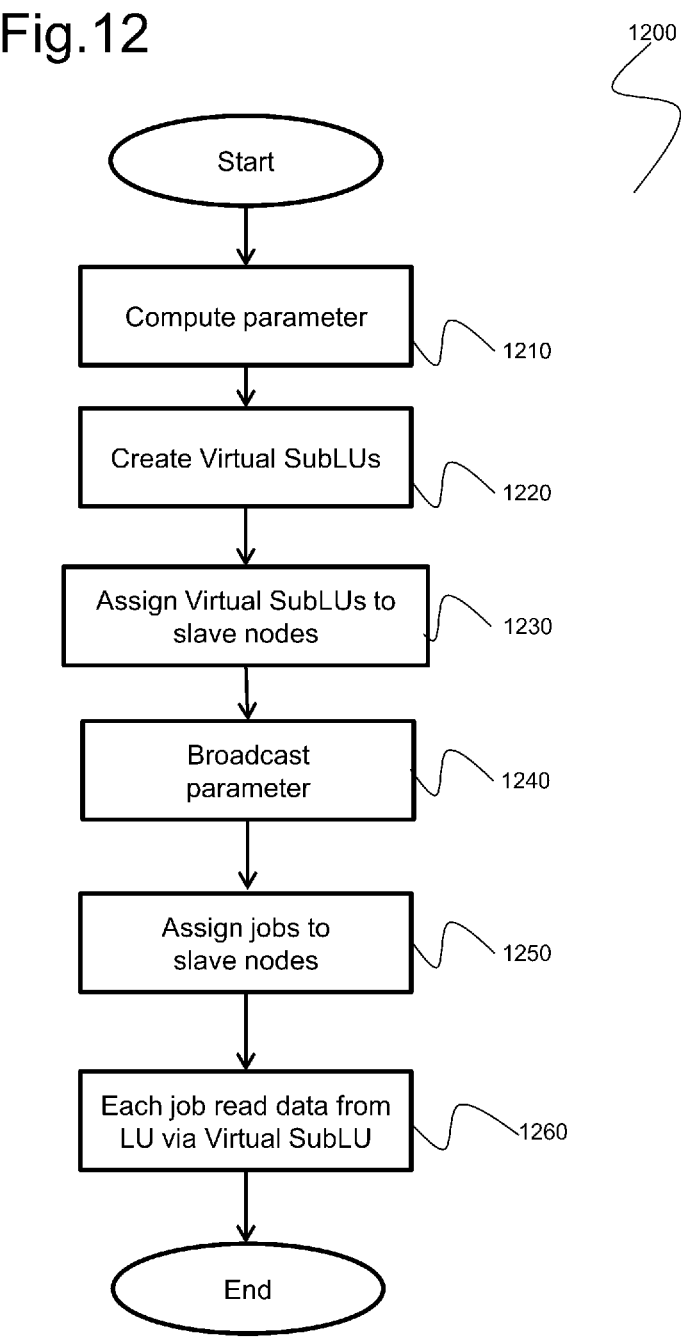
FIG. 12 is a flowchart illustrating the steps for subjecting the analysis data to distribution processing.

FIG. 12 illustrates a flowchart of process flow 1200 for subjecting data stored in data flow 1100 shown in FIG. 11 to distribution processing. Steps 1210, 1220, 1230 and 1240 are processed by the storage management program 521 of the management server 120. Here, step 1210 is equivalent to step 1010 of FIG. 10, step 1220 is equivalent to step 1050 of FIG.

10, step 1230 is equivalent to step 1055 of FIG. 10, and step 1240 is equivalent to step 1060 of FIG. 10. Through these steps 1210 through 1240, it becomes possible to allocate virtual sub LUs to respective slave nodes 130. However, it is not necessary that the compute function 223 and the parameter 224 determined in step 1210 are equal to the values determined in above-mentioned step 1010 during storage of data.

Step 1250 is executed via the job scheduling program 221 of the master server 110. The job scheduling program 221 computes using the layout computation program 222 the virtual sub LU number X corresponding to each block of the LU storing the process target data and the slave node 130 connected to that virtual sub LU, and transmits the virtual sub LU number X, the block Y within the virtual sub LU and the target job program 421 to the computed slave node 130.

Step 1260 is executed by the target job program 421 received by the slave node 130. The target job program 421 reads data via the steps of the process flow 800 of FIG. 8 from the virtual sub LU number X and the block Y of the virtual sub LU received from the master server 110 in step 1250, and subjects the read data to data processing. In the data processing of step 1260, upon reading the target data from the shared storage 140, processing can be performed without having to communicate with other computers. Through execution of this process flow 1200, the plurality of data blocks stored in LU 610 are assigned to the slave nodes 130 via multiple virtual sub LUs, and the multiple slave nodes 130 can perform distribution processing.

Figure 13:
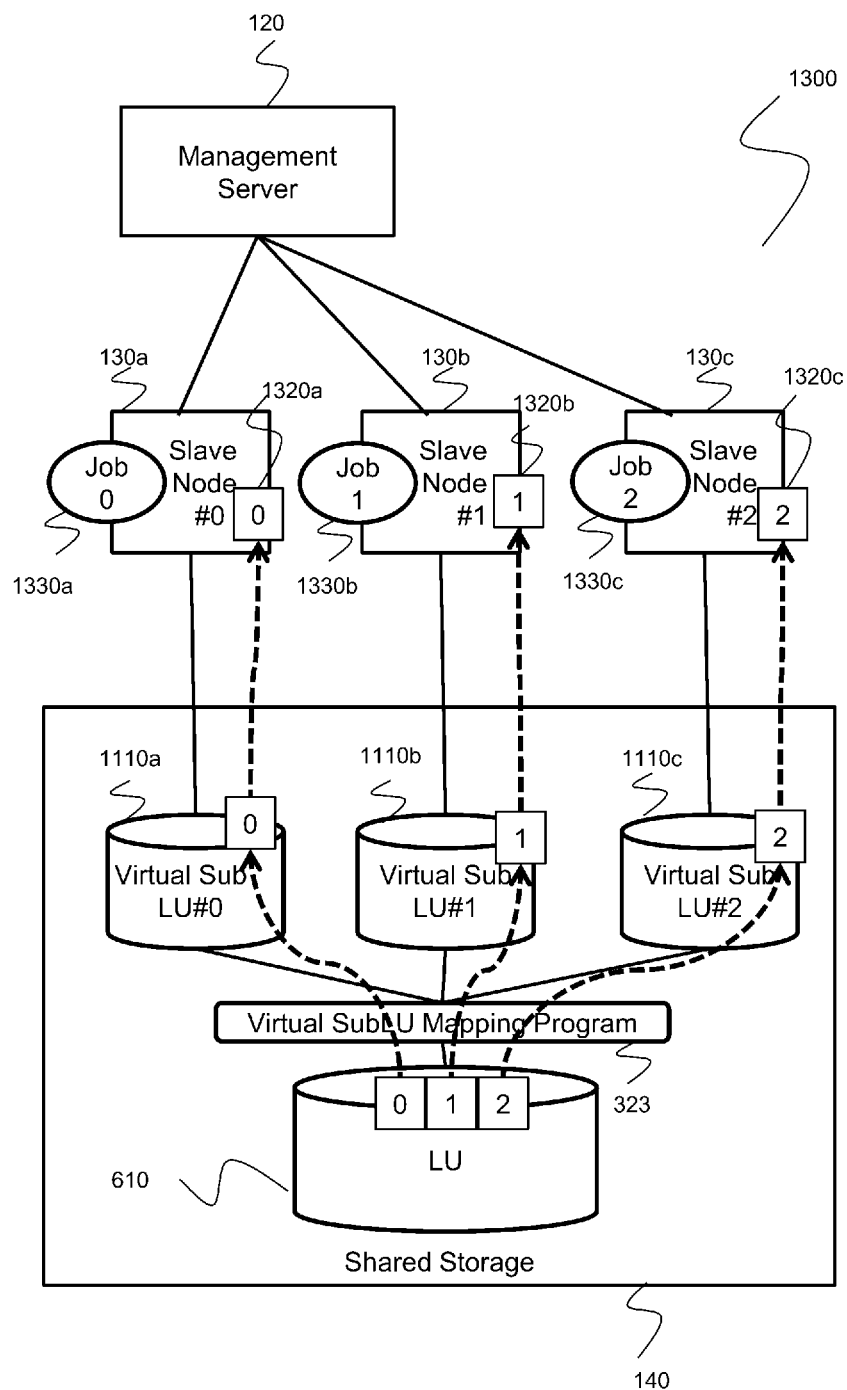
FIG. 13 is a view showing a path for reading data from the LU during distribution processing of analysis data.

FIG. 13 illustrates one example of the flow of data during process flow 1200. In FIG. 13, similar to FIGS. 7 and 11, residue calculation is used as the compute function 223 and N=3 is used as the parameter 224, according to which three virtual sub LUs 1110*a* (number 0), 1110*b* (number 1) and 1110*c* (number 2) are created from LU 610. It is assumed that these virtual sub LUs connect to corresponding slave nodes 130*a* (number 0), 130*b* (number 1) and 130*c* (number 2), and that data blocks 1120*a* (number 0), 1120*b* (number 1) and 1120*c* (number 2) are already stored in the LU 610. In order to process the three data blocks, the management server 120 generates three jobs 1330*a* (number 0), 1330*b* (number 1) and 1330*c* (number 2) via the layout computation program 222.

The management server 120 performs computation so that the data blocks 1120*a* (number 0), 1120*b* (number 1) and 1120*c* (number 2) having numbers corresponding to respective jobs can be read from the LU 610 via the respective virtual sub LUs 1110*a* (number 0), 1110*b* (number 1) and 1110*c* (number 2). Therefore, the management server 120 sends the respective jobs 1330*a* (number 0), 1330*b* (number 1) and 1330*c* (number 2) to slave nodes 130*a* (number 0), 130*b* (number 1) and 130*c* (number 2) for data processing. The data being the target of processing of each job exists internally in the virtual sub LU connected to the slave node in which the job is executed, so that there is no need to communicate with other nodes in order to read data blocks.

Embodiment 2

In order to perform data distribution processing in the computer system 100 illustrated in FIG. 1, the slave nodes 130 and the shared storage 140 can adopt a different configuration as embodiment 1.

Figure 14:
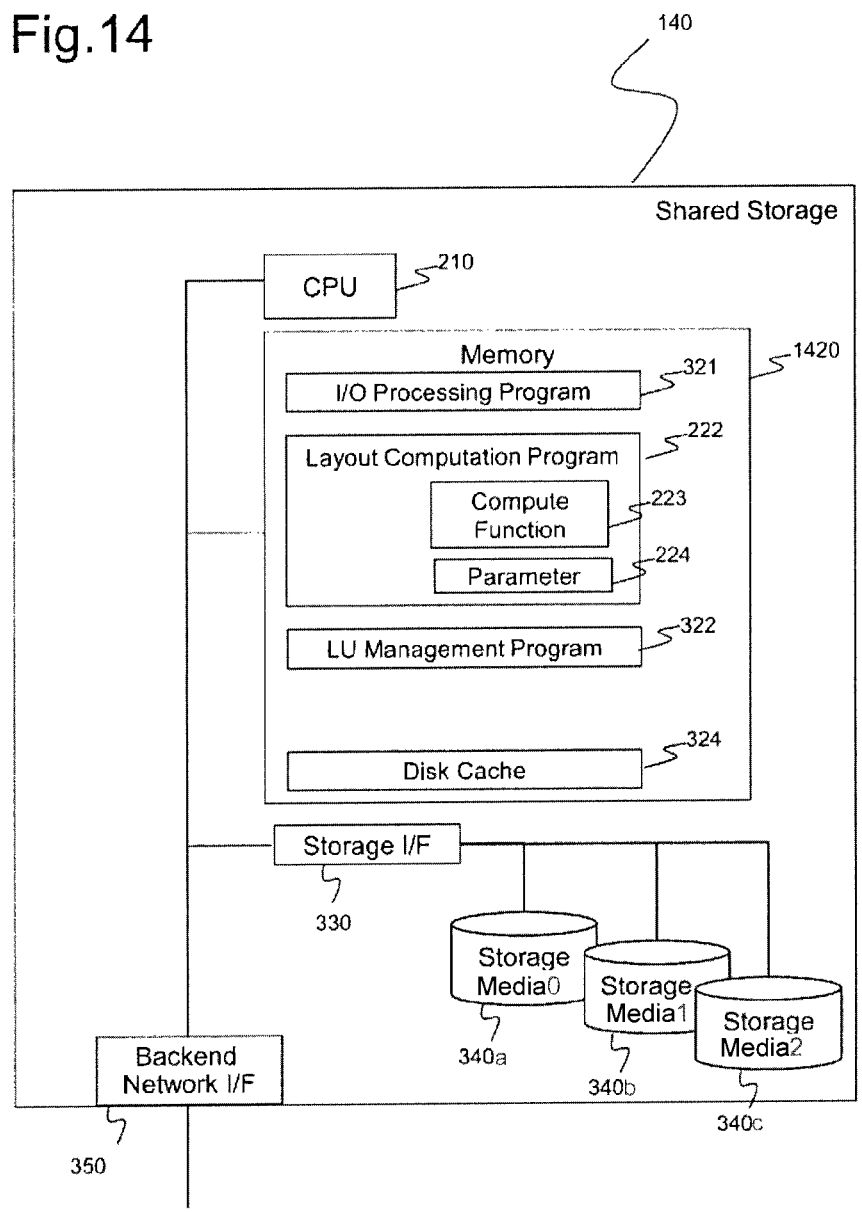
FIG. 14 is a configuration diagram of a slave node according to embodiment 2.

FIG. 14 illustrates a configuration diagram of the shared storage 140 according to embodiment 2. Compared to the configuration of the memory 220 according to embodiment 1 illustrated in FIG. 2, in FIG. 14, the memory 1420 does not have a virtual sub LU mapping program 323, but the other components are the same.

Figure 15:
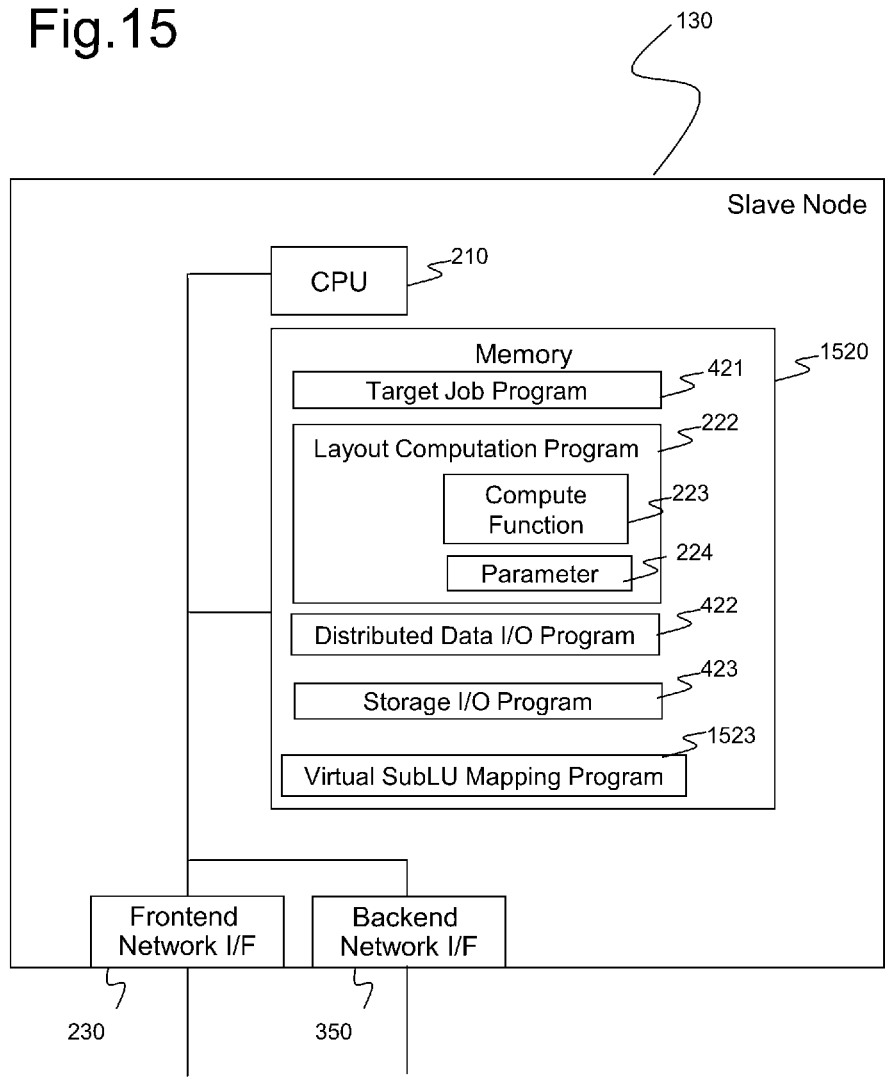
FIG. 15 is a configuration diagram of a shared storage according to embodiment 2.

FIG. 15 is a configuration diagram of the slave node 130 according to embodiment 2. Compared to the configuration of the memory 320 of embodiment 1 illustrated in FIG. 3, in FIG. 15, the memory 1520 has a virtual sub LU mapping program 1523, but the other components are the same.

Figure 16:
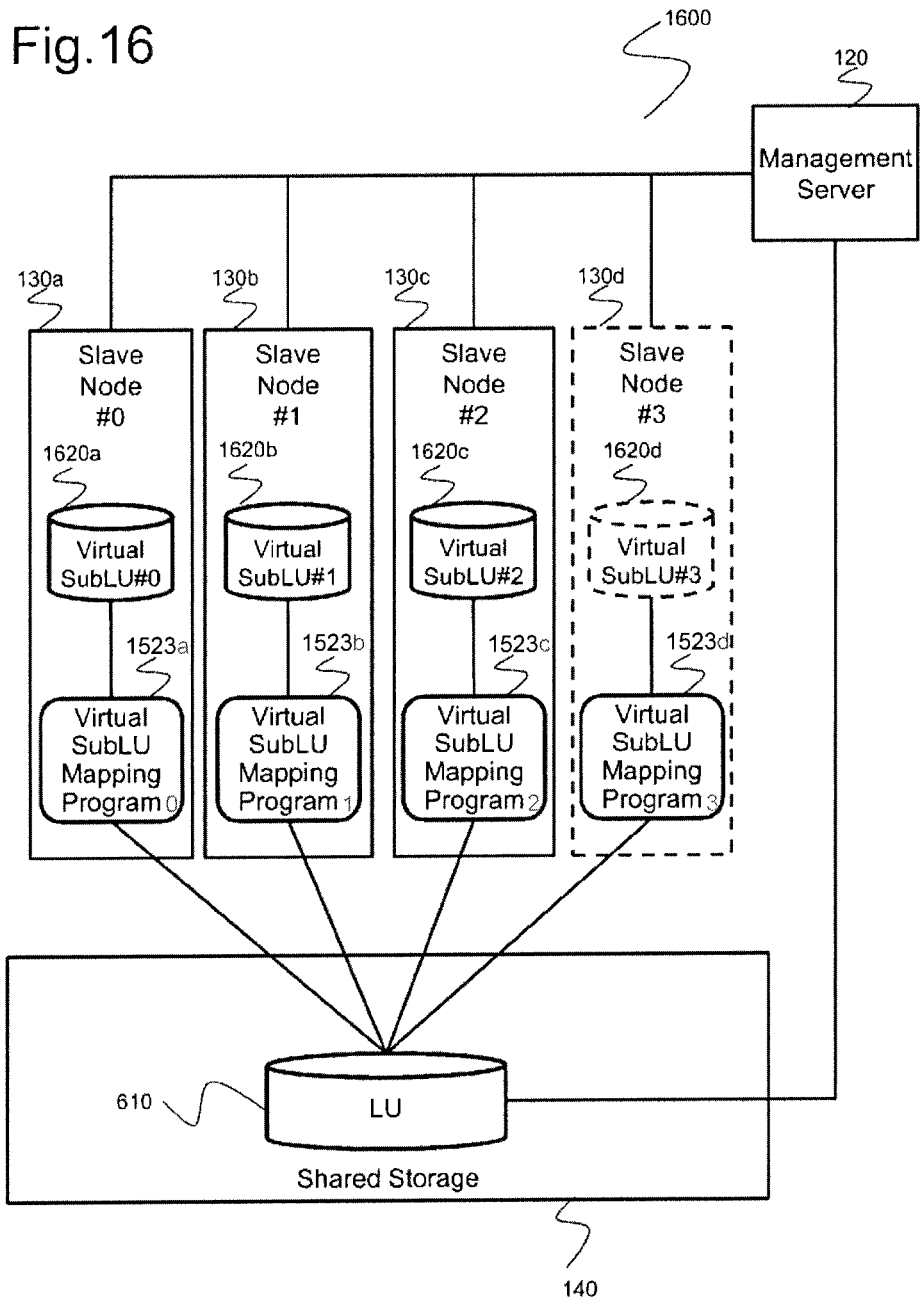
FIG. 16 is a relationship diagram of the slave node, the virtual sub LU and the LU according to embodiment 2.

FIG. 16 is a relationship diagram 1600 related to data management according to embodiment 2. The relationship diagram 1600 has a similar configuration as the relationship diagram 600 of embodiment 1, but the differences are that the virtual sub LU mapping program 323 that had existed in the shared storage 140 in relationship diagram 600 is not included in the present diagram, and that each slave node 130*a-c* has stored therein a virtual sub LU mapping program 1523*a-c*.

According to the configuration of the relationship diagram 1600, the slave nodes 130*a* through 130*c* are respectively directly coupled to the LU 610 within the shared storage 140. However, the virtual sub LU mapping programs 1523*a-c* provided in each of the slave nodes 130*a* through 130*c* compose virtual sub LUs 1620*a* through 1620*c* corresponding to the slave node numbers, and thus, each slave node can write data to or read data from the LU 610 via the I/O request to the virtual sub LU 1620.

In embodiment 1, the virtual sub LU mapping program 1523 performs similar processes as FIG. 7 performed by the virtual sub LU mapping program 323, the process flow 800 or the process flow 900 of embodiment 1, and constructs virtual sub LUs or perform I/O processing. However, the virtual sub LU mapping program 323 according to embodiment 1 creates multiple virtual sub LUs, but according to embodiment 2, the virtual sub LU mapping program 1523 only creates a virtual sub LU corresponding to the number of the slave node 130 in which the program is executed.

The increase or decrease of slave nodes 130 can be performed similarly as FIG. 6 of embodiment 1. For example, if a new slave node 130*d* is to be added to the slave nodes 130*a* through 130*c*, the management server 120 notifies parameters 224 corresponding to the number of nodes to virtual sub LU mapping programs 1523*a-d* of the respective slave nodes 130*a* through 130*d*, and demands reconstruction of the virtual sub LU, by which a virtual sub LU 1620*d* corresponding to slave node 130*d* can be constructed.

Regarding the storage of data and the processing procedure of embodiment 2, compared to embodiment 1 where the virtual sub LU mapping program 323 is stored in the shared storage 140, the virtual sub LU mapping program 1523 is stored in the respective slave nodes 130, but other than that, the process flow is the same as the process flows 1000 and 1200 of embodiment 1. Moreover, via the process flow 1000 and process flow 1200, data distribution processing can be performed during increase and decrease of the number of slave nodes 130 without having to move the data.

Embodiment 3

According to embodiment 1, virtual sub LUs are composed from the LU and assigned to a plurality of slave nodes 130, but a similar processing can be performed by composing virtual sub files from files.

Figure 17:
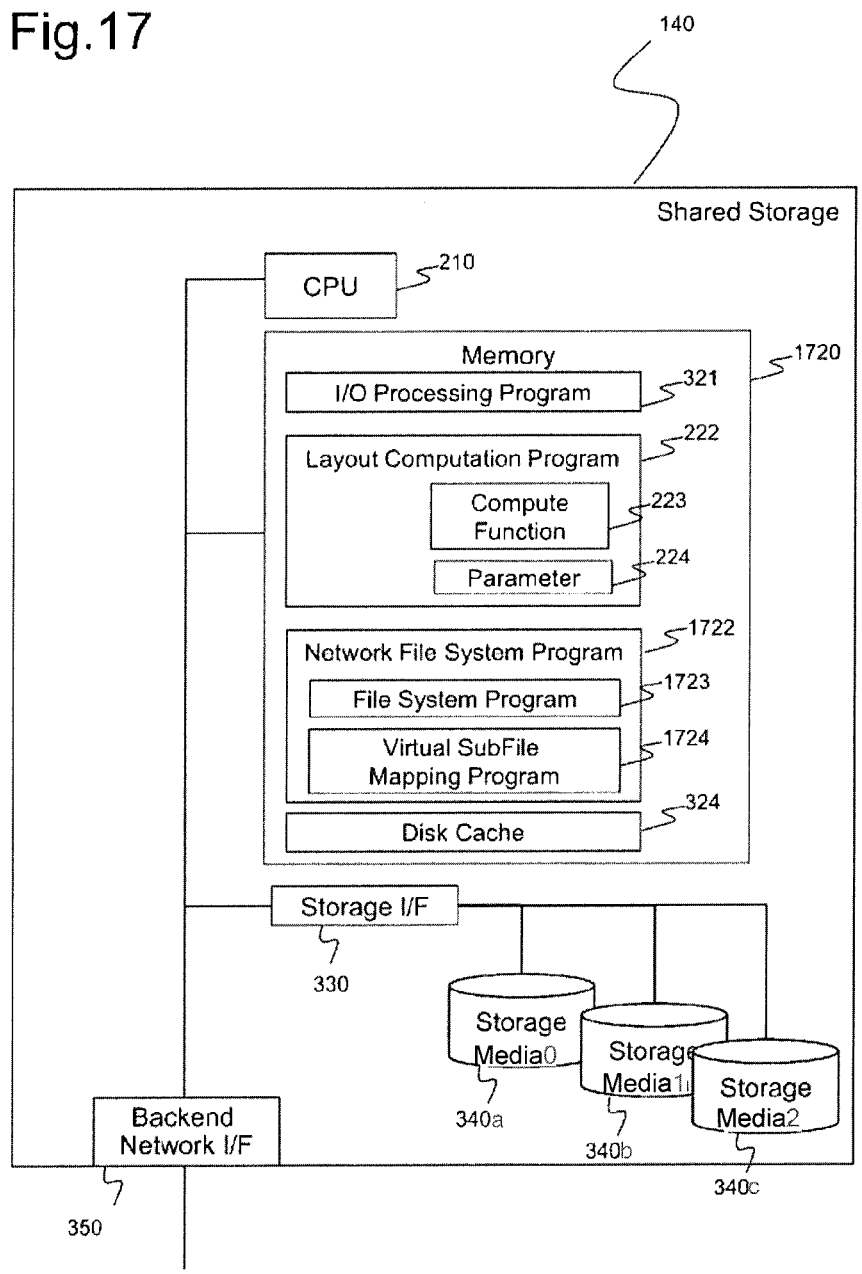
FIG. 17 is a configuration diagram of the shared storage according to embodiment 3.

FIG. 17 is a configuration diagram of the shared storage 140 according to embodiment 3. Compared to the configuration illustrated in FIG. 3, a network file system program 1722 is included in a memory 1720 according to the present configuration.

The network file system program 1722 is a program for receiving an I/O request to the file from other computers via the backend network interface 350, storing the data of the request target file in the storage media 340*a-c*, or reading the data of the request target file from the storage media 340*a-c*. A file system program 1723 included in the network file system program 1722 provides a file system function for managing the location of the files stored in the storage media 340*a-c* or the metadata information of files such as the file names and file sizes. Request protocols of the file I/O via the network include an NFS (Network File System) or a CIFS (Common Internet File System). The file system function includes implementation methods such as Ext3, Ext4, XFS (Registered Trademark) and NTFS.

A virtual sub file mapping program 1724 stored in the network file system program 1722 creates multiple virtual sub files from the files in the file system, and constructs a virtual sub file system including virtual sub files. The virtual sub file mapping program 1724 is a program for realizing I/O requests from external computers via the network to the virtual sub files within the virtual sub file system.

The virtual sub file mapping program 1724 performs similar processes as the process of FIG. 7 performed by the virtual sub LU mapping program 323 or the process flows 800 and 900 according to embodiment 1, and constructs virtual sub files and performs I/O processes. However, according to embodiment 1, the virtual sub LUs were composed of LU and the I/O processing of virtual sub LUs were converted into I/O processing of the LU, but in the present embodiment 3, similar processing is performed not to the LU but to files, so that virtual sub files and virtual sub file systems are composed of files and the I/O processing of virtual sub files are converted into I/O processing of files.

Since files names are included in the file I/O requests, parameters related to file names are added to the parameter 224 of the layout computation program 222. In the I/O conversion processing of files and virtual sub files, the virtual sub file mapping program 1724 also converts files names of files and virtual sub files according to the result of the layout computation program 222.

FIG. 18 illustrates a relationship diagram 1800 related to data management according to embodiment 3. The relationship diagram 1800 adopts a similar configuration as the relationship diagram 600 of embodiment 1, whereas in relationship diagram 600, the shared storage 140 includes an LU and virtual sub LUs, and receives I/O processing from slave nodes 130, but in relationship diagram 1800, the shared storage 140 constructs a files system and virtual sub file systems, and receives file I/O processing from slave nodes 130.

The shared storage 140 has a file system 1810, and retains an arbitrary number of files 1820. Similar to the virtual sub LU mapping program 323, the virtual sub file mapping program 1724 constructs multiple virtual sub file systems 1830*a* through 1830*c* from the file system 1810 according to the result of the layout computation program 222.

Further, a virtual sub file mapping program 1724 creates virtual sub files 1840*a* through 1840*c* composed of partial blocks of files 1820 in response to the result of the layout computation program 222 regarding the respective files 1820 within the file system 1810. The virtual sub files 1840*a* through 1840*c* can have the same file names as the original files 1820 or can have different names. If the names of the virtual sub files 1840*a* through 1840*c* are set to have the same names as the original files 1820, the file number X of the target virtual sub files is determined according to slave nodes 130*a* through 130*c* outputting the file I/O requests, so that even if the file names are the same, the contents of the blocks differ between slave nodes 130. As an example of assigning names to virtual sub files 1840*a* through 1840*c* that differ from the original files, names having added the file number X of the virtual sub file to the file names of the original file 1820 can be provided. In that case, files having the same file name do not retain different block contents.

The increase or the decrease of the number of slave nodes 130 can be performed similarly as FIG. 6 of embodiment 1. For example, if a new slave node 130*d* is to be added to the plurality of slave nodes 130*a* through 130*c*, the management server 120 notifies the parameter 224 according to the number of nodes to the virtual sub file mapping program 1724 in the shared storage 140, and demands reconstruction of the virtual sub file system and the virtual sub files, by which a virtual sub file system 1830*d* and a virtual sub file 1840*d* corresponding to slave node 130*d* can be constructed.

The storage of data or the process sequence according to the present embodiment 3 is similar to embodiment 1 illustrated in FIG. 7 and process flows 1000 and 1200, except for the point that the I/O target is changed from LUs and virtual sub LUs to files and virtual sub files. Data distribution processing can be performed via process flows 1000 and 1200 without having to move data during increase or decrease of slave nodes 130.

Embodiment 4

In embodiment 1, the analysis target data was stored in a single LU and subjected to processing, but if there are multiple analysis target data, each data can be stored in various numbers of multiple LUs for processing.

FIG. 19 illustrates a computer system 1900 performing data distribution processing regarding the present embodiment 4. Compared to the computer system 100 of embodiment 1, the computer system 1900 has a metadata server 1910 added thereto, but the other components are the same.

FIG. 20 illustrates a configuration diagram of a metadata sever 1910. The metadata sever 1910 is composed of a CPU 210, a memory 2020, and a frontend network interface 230. The memory 2020 stores a file layout management program 2021. The file layout management program 2021 stores a file layout table 2022 illustrating the information related to which blocks of which LU within the shared storage 140 store the multiples files being the analysis target data in the computer system 1900.

The file layout management program 2021 returns the contents of the file layout table 2022 based on the requests from other computers via the frontend network interface 230, and changes the file layout table 2022 in response to add or delete requests of files.

In the computer system 1900, the metadata sever 1910 is illustrated as an independent computer, but if the master server 110 or the management server 120 is equipped with the file layout management program 2021, the master server 110 or the management server 120 can also function as the metadata sever 1910.

FIG. 21 illustrates an example of the file layout table 2022. The file layout table 2022 stores a file name 2110, an LU identifier 2120, an offset 2130 and a length 2140. The file layout table 2022 stores entries 2150, 2151 and 2152 for each file being stored.

The file name 2110 is a name for uniquely identifying the analysis target data. The LU identifier 2120 is a number for identifying the LU in the shared storage 140. Further, the LU identifier 2120 can store a number capable of identifying both the shared storage 140 and the LU, if there are multiple shared storages 140. The offset 2130 shows the beginning position within the LU storing the file of the relevant entry. As shown in entries 2151 and 2152, multiple files can be allocated to the same LU.

Similar to the LU 610 illustrated in the relationship diagram 600 of FIG. 6 and FIG. 7 related to embodiment 1, the respective LUs in the shared storage 140 constitute multiple virtual sub LUs through compute function 223 and parameter 224 via the LU management program 322 and the virtual sub LU mapping program 323 of the shared storage 140, and can connect to the virtual sub LUs through the slave nodes 130. Moreover, the I/O processing requests from the management server 120 or the slave nodes 130 to the shared storage can be processed via the steps of the process flow 800, similar to embodiment 1.

In embodiment 1, a single process target data corresponded to a single LU, but in present embodiment 4, the LU and the process target data do not have a one-to-one correspondence, so that a single data can be stored as files in multiple LUs, or a portion of a number of files can be stored in a single LU. Therefore, in order to refer to the process target data, it is necessary to acquire the corresponding relationship between the files and the positions within the LU.

FIG. 22 illustrates a process flow 2200 related to data storage for storing the analysis target data to the LU 610 in the present configuration 1900. The present process flow 2200 is processed via the data placement program 522 of the management server 120. At first, in step 2210, in order to create a file for storing the process target data, the management server 120 notifies the file name and the file size to the metadata sever 1910 and sends a request to create a file. The metadata server 1910 having received the request to create a file searches an area that is not used by other files within a plurality of LUs, and creates an entry of the new file within the file layout table 2022 to refer to the searched area.

In the subsequent step 2220, the management server 120 acquires the entry of the file created from the file layout table 2022 of the metadata sever 1910. At this point of time, the management server 120 can determine the identifier of the LU for storing the file and the block location within the LU. For example, if the relevant entry within the file layout table 2022 indicates an LU identifier V and an offset W, the block X within the process target data can be computed as being stored in blocks (W+X) within the LU. Thereafter, in the aforementioned process flow 1000, it becomes possible to create a virtual sub LU from the LU 610 of identifier V, obtain the block location within the virtual sub LU from the blocks (W+X) within the LU, and perform I/O processing.

FIG. 23 illustrates a process flow 2300 for subjecting the data stored in process flow 2200 to distribution processing. In step 2310, the management server 120 acquires an entry of the process target file from the file layout table 2022 of the metadata server 1910 based on the file name. At this point of time, the management server 120 can determine the identifier of the LU storing the file, the block position within the LU, and the length. Therefore, the management server 120 can complete the distribution processing of the file by executing the process flow 1200 of distribution processing described earlier to the LU having the acquired identifier, the block location and the length acquired in step 2310 set as the processing target.

REFERENCE SIGNS LIST

130: Slave node
140 Shared storage
323: Virtual sub LU mapping program
600: Relationship diagram of slave node, virtual sub LU and LU
610: LU
620: Virtual sub LU

The invention claimed is:

1. A distribution processing unit of a shared storage in a system comprising:
    a master server for performing job management;
    a plurality of two or more slave nodes for executing independent jobs;
    a shared storage having a plurality of storage media for storing data;
    a management server for managing the shared storage; and
    a network connecting these components;
    wherein
    a mapping means for dividing one or more LUs (Logical Units) composed of the plurality of storage media into two or more virtual sub LUs is included in the shared storage or in each slave node of the plurality of slave nodes;
    when a number of divisions of the virtual sub LUs is designated as a parameter for dividing the LUs, the mapping means rearranges the LUs into virtual sub LUs divided into the designated number, and the blocks within the LU are associated with the LU number of the virtual sub LUs and the blocks within the virtual sub LUs having the LU number;
    when the mapping means is included in each slave node of the plurality of slave nodes, the mapping means of a slave node rearranges the virtual sub LU associated with the LU as the virtual sub LU of the slave node in which it is included, and further associates a given block within the LU with a block within the virtual sub LU of the slave node in which it is included;
    the management server has a data storage means; and
    when storing data to the LU, the data storage means connects the slave node having created the virtual sub LU associated with the block within said LU, and stores the storage target data to the LU via the block within the virtual sub LU associated with said slave node.

2. The distribution processing unit of a shared storage in a system according to claim 1, wherein
    the mapping means is configured to designate a size for each virtual sub LU.

3. The distribution processing unit of a shared storage in a system according to claim 1, wherein
    when storing data to the LUs, the data storage means connects a slave node within the plurality of slave nodes corresponding to the LU number of the virtual sub LU associated with the block within the LU, and stores a storage target data to the block within the LU via the slave node and the block within the virtual sub LU having the LU number associated therewith.

4. The distribution processing unit of a shared storage in a system according to claim 1, wherein
    the management server has a storage management means; and
    when subjecting the data stored in the LU to distribution processing,
    the storage management means assigns the virtual sub LU to each slave node in the plurality of slave nodes; and
    the slave node reads the process target data via the block in the virtual sub LU having the virtual sub LU number associated with the block in the LU storing the process target data, and executes the distribution processing.

5. The distribution processing unit of a shared storage in a system according to claim 1, wherein the management server has a storage management means; and when subjecting the data stored in the LU to distribution processing, the storage management means connects the virtual sub LU created in each slave node of the plurality of slave nodes to the LU; and the slave node reads the target data to be processed via the block within the virtual sub LU having the virtual sub LU number associated with the block in the LU storing the data being the target of distribution processing, and executes the distribution processing.

6. A distribution processing unit of a shared storage in a system comprising:

a master server for performing job management;

a plurality of two or more slave nodes for executing independent jobs;

a shared storage having a plurality of storage media for storing data;

a management server for managing the shared storage; and a network connecting these components;

wherein a mapping means for dividing one or more files retained in a file system stored in a storage medium constituting the plurality of storage media into two or more virtual sub file systems and virtual sub files is included in the shared storage or in each slave node of the plurality of slave nodes;

when a number of divisions of the virtual sub files is designated as a parameter for division, the mapping means rearranges the files into virtual sub file systems and virtual sub files divided into the designated number, and respectively associates multiple blocks within the files with respective virtual sub file numbers for identifying the virtual sub files;

when the mapping means is included in each slave node of the plurality of slave nodes, the mapping means of a slave node rearranges the virtual sub file systems and virtual sub files associated with the file as the virtual sub file systems and virtual sub files of the slave node in which it is included, and further associates a given block within the file with the virtual sub files with the respective virtual sub file number of the slave node in which it is included;

the management server has a data storage means; and when storing data to the file, the data storage means connects the slave node having created the virtual sub file systems and virtual sub files associated with the block within said file, and stores the storage target data to the file via the virtual sub files within the virtual sub file systems and virtual sub files associated with said slave node.

7. The distribution processing unit of a shared storage in a system according to claim 6, wherein when the file name of said file and the respective file names of the number of virtual sub files corresponding to the designated division number are the same, the file names of the respective virtual sub files associated with the respective blocks within the file will be the same, but the contents of the respective virtual sub files mutually differ according to the slave nodes accessing the respective virtual sub files.

8. The distribution processing unit of a shared storage in a system according to claim 6, wherein when the file name and the virtual sub file name are different names, the virtual sub file name is determined by adding the virtual sub file number to the file name.

9. The distribution processing unit of a shared storage in a system according to claim 8, wherein when storing data to the file, the data storage means connects the slave node of the plurality of slave nodes corresponding to the virtual sub file number associated with the block within the file, and stores the storage target data via the slave node and the associated virtual sub file to the block within the file.

10. The distribution processing unit of a shared storage in a system according to claim 6, wherein the management server has a storage management means; and when subjecting the data stored in the file to distribution processing, the storage management means assigns the virtual sub file to each slave node of the plurality of slave nodes;

the slave node reads the target data to be processed via the virtual sub file having the virtual sub file number associated with the block within the file storing the target data to be processed, and executes distribution processing.

11. A distribution processing unit of a shared storage in a system comprising:

a master server for performing job management;

a plurality of two or more slave nodes for executing independent jobs;

a shared storage having a plurality of storage media for storing data;

a management server for managing the shared storage; and a network connecting these components;

wherein the shared storage includes a mapping means for dividing one or more LUs (Logical Units) composed of the plurality of storage media into two or more virtual sub LUs;

when a number of division of the virtual sub LUs is designated as a parameter for dividing the LUs, the mapping means rearranges the LUs into virtual sub LUs divided into the designated number, and the blocks within the LU are associated with the LU number of the virtual sub LUs and the blocks within the virtual sub LUs having the LU number; and when multiple files are stored in the one or more LUs (Logical Units), regarding each file of the multiple files, the mapping means rearranges the multiple virtual sub LUs and associates blocks based on the information on the LUs in which the multiples files are stored and the blocks within the LUs, and wherein the management server has a data storage means; and when storing data to the LU, the data storage means creates a file for storing the data by specifying the LU and specifying the block location within the LU, connects the slave node within the plurality of slave nodes corresponding to the LU number of the virtual sub LU associated with the block within the specified LU, and stores the storage target data via the slave node and the block within the virtual sub LU of the LU number associated therewith to a file created within the LU.

12. The distribution processing unit of a shared storage in a system according to claim 11, wherein the management server has a storage management means; and when subjecting the data stored in the file to distribution processing, the storage management means assigns the virtual sub LU to each slave node of the plurality of slave nodes; and the slave node reads the target data to be processed via a block within the virtual sub LU having the LU number associated with the block within the LU in which the file storing the target data to be processed is located, and executes distribution processing.

* * * * *